(12) United States Patent
Wyrwas et al.

(10) Patent No.: US 9,582,117 B2
(45) Date of Patent: Feb. 28, 2017

(54) PRESSURE, ROTATION AND STYLUS FUNCTIONALITY FOR INTERACTIVE DISPLAY SCREENS

(71) Applicant: QUALCOMM Incorporated, San Diego, CA (US)

(72) Inventors: John Michael Wyrwas, Mountain View, CA (US); Evgeni Petrovich Gousev, Saratoga, CA (US); Russell Wayne Gruhlke, Milpitas, CA (US); Khurshid Syed Alam, Mountain View, CA (US); Jacek Maitan, Mountain View, CA (US); Linda Stacey Irish, San Diego, CA (US); Evgeni Yurij Poliakov, San Mateo, CA (US); Thomas Gordon Brown, Rochester, NY (US); Samir Kumar Gupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 14/502,726

(22) Filed: Sep. 30, 2014

(65) Prior Publication Data

US 2015/0309662 A1  Oct. 29, 2015

Related U.S. Application Data

(60) Provisional application No. 61/985,325, filed on Apr. 28, 2014.

(51) Int. Cl.
*G06F 3/042* (2006.01)
*G06F 3/0354* (2013.01)
(Continued)

(52) U.S. Cl.
CPC .......... *G06F 3/0421* (2013.01); *G06F 3/0386* (2013.01); *G06F 3/03542* (2013.01);
(Continued)

(58) Field of Classification Search
CPC . G06F 2203/04104; G06F 2203/04109; G06F 3/03542; G06F 3/03545;
(Continued)

(56) References Cited

U.S. PATENT DOCUMENTS 6,956,608 B1    10/2005  Shapiro et al.
8,077,929 B2    12/2011  Heidt
(Continued)

FOREIGN PATENT DOCUMENTS

DE    19535803    3/1997
EP    0609812     8/1994
(Continued)

OTHER PUBLICATIONS

International Search Report and Written Opinion—PCT/US2015/021245—ISA/EPO—Jul. 10, 2015.
(Continued)

*Primary Examiner* — Hong Zhou
(74) *Attorney, Agent, or Firm* — Weaver Austin Villeneuve & Sampson LLP

(57) ABSTRACT

This disclosure provides systems, methods and apparatus related to touch and gesture recognition with an electronic interactive display. The interactive display has a front surface that includes a viewing area, a planar light guide disposed proximate to and behind the front surface, a light source, and at least one photo sensing element coupled with the first planar light guide. The planar light guide is configured to receive scattered light, the received scattered light resulting from interaction between light emitted by the light source and an object in optical contact with the front surface.

(Continued)

The photo sensing element is configured to detect at least some of the received scattered light and to output, to a processor, image data. The processor is configured to recognize, from the image data, one or both of a contact pressure and a rotational orientation of the object.

25 Claims, 18 Drawing Sheets

(51) Int. Cl.
    *G06F 3/038*         (2013.01)
    *G06F 3/041*         (2006.01)

(52) U.S. Cl.
    CPC .......... *G06F 3/03545* (2013.01); *G06F 3/042* (2013.01); *G06F 3/0412* (2013.01); *G06F 3/0425* (2013.01); *G06F 2203/04104* (2013.01); *G06F 2203/04109* (2013.01)

(58) Field of Classification Search
    CPC ...... G06F 3/0386; G06F 3/0412; G06F 3/042; G06F 3/0421; G06F 3/0425
    USPC .......................................... 345/175
    See application file for complete search history.

(56) References Cited

U.S. PATENT DOCUMENTS

| | | |
|---|---|---|
| 8,605,960 B2 | 12/2013 | Orsley |
| 2002/0076089 A1 | 6/2002 | Muramatsu et al. |
| 2002/0131624 A1 | 9/2002 | Shapiro et al. |
| 2004/0234107 A1 | 11/2004 | Machida et al. |
| 2005/0069180 A1 | 3/2005 | Setlak et al. |
| 2005/0162398 A1 | 7/2005 | Eliasson et al. |
| 2006/0001654 A1* | 1/2006 | Smits .................. G06F 3/03542 345/176 |
| 2007/0189588 A1 | 8/2007 | Kim et al. |
| 2007/0197261 A1 | 8/2007 | Humbel |
| 2009/0039241 A1 | 2/2009 | Ueki |
| 2009/0058598 A1 | 3/2009 | Sanchez Sanchez et al. |
| 2009/0141285 A1* | 6/2009 | Levola .................. G01B 11/002 356/499 |
| 2011/0102567 A1 | 5/2011 | Erhart |
| 2011/0122091 A1* | 5/2011 | King ..................... G06F 3/0421 345/175 |
| 2012/0249477 A1* | 10/2012 | Popovich ................ G06F 3/042 345/175 |
| 2013/0106798 A1 | 5/2013 | Sundara-Rajan et al. |
| 2013/0181949 A1 | 7/2013 | Setlak |
| 2013/0265137 A1 | 10/2013 | Nelson et al. |
| 2013/0285977 A1 | 10/2013 | Baharav et al. |
| 2013/0314312 A1 | 11/2013 | Gruhlke et al. |
| 2014/0098058 A1* | 4/2014 | Baharav ................ G06F 3/0421 345/174 |
| 2014/0168162 A1* | 6/2014 | Liao ........................ G06F 3/042 345/175 |
| 2014/0340351 A1* | 11/2014 | Forlines ................ G06F 3/0416 345/174 |
| 2015/0310251 A1 | 10/2015 | Wyrwas et al. |

FOREIGN PATENT DOCUMENTS

| | | |
|---|---|---|
| EP | 1286518 | 2/2003 |
| EP | 1420525 | 5/2004 |
| EP | 1835438 | 9/2007 |
| EP | 1988489 | 11/2008 |
| EP | 2131322 | 12/2009 |
| EP | 2336859 A1 | 6/2011 |
| GB | 2417858 | 3/2006 |
| JP | 2013175142 A | 9/2013 |
| WO | 9706506 A2 | 2/1997 |
| WO | WO-2008055164 A1 | 5/2008 |
| WO | WO-2013111447 | 8/2013 |
| WO | 2013165749 A1 | 11/2013 |
| WO | WO-2015167683 | 11/2015 |
| WO | WO-2015167711 | 11/2015 |

OTHER PUBLICATIONS

Invitation to Pay Additional Fees and, Where Applicable, Protest Fee—PCT/US2015/022775—ISA/EPO—Jun. 24, 2015.
International Search Report and Written Opinion—PCT/U52015/022775—ISA/EPO—Oct. 5, 2015.
Written Opinion of the International Preliminary Examining Authority, dated Apr. 25, 2016, issued in Application No. PCT/US2015/021245.
Second Written Opinion—PCT/US2015/022775—ISA/EPO—May 13, 2016.
International Preliminary Report on Patentability—PCT/US2015/022775—ISA/EPO—Oct. 7, 2016.
Bangladesh Office Action dated Sep. 1, 2016 issued in BD/P/2015/96.
International Preliminary Report on Patentability—PCT/US2015/021245—ISA/EPO—Jul. 21, 2016.

* cited by examiner

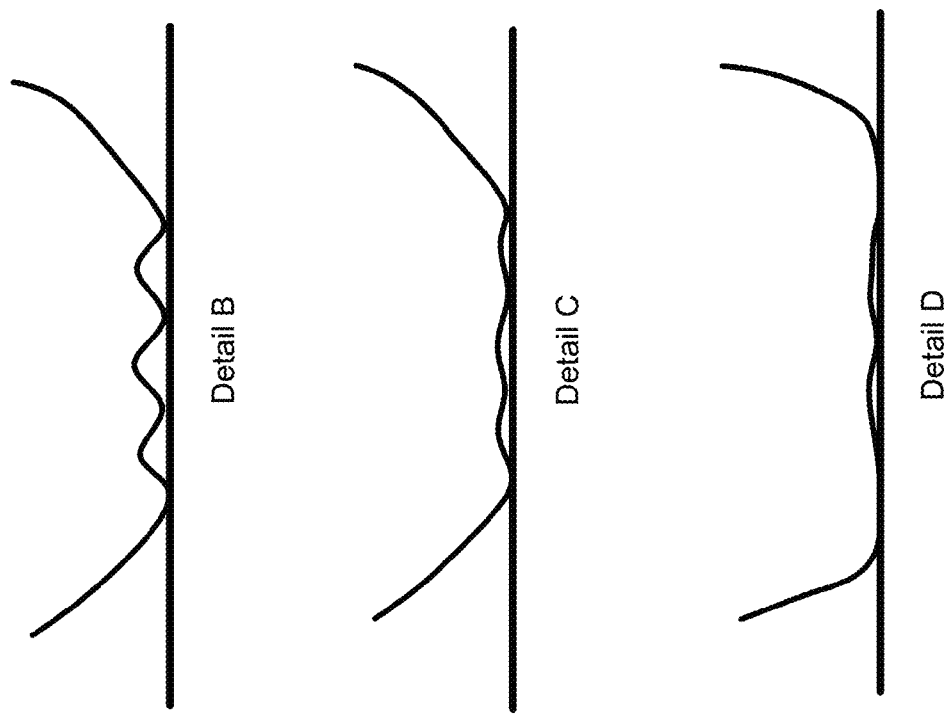
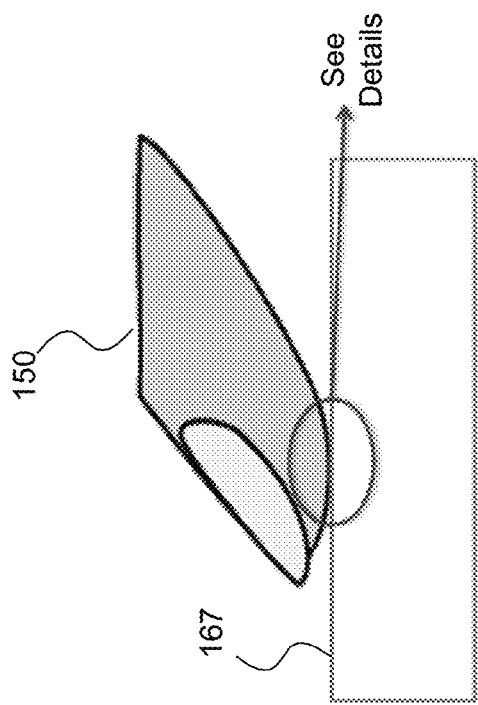
Figure 4

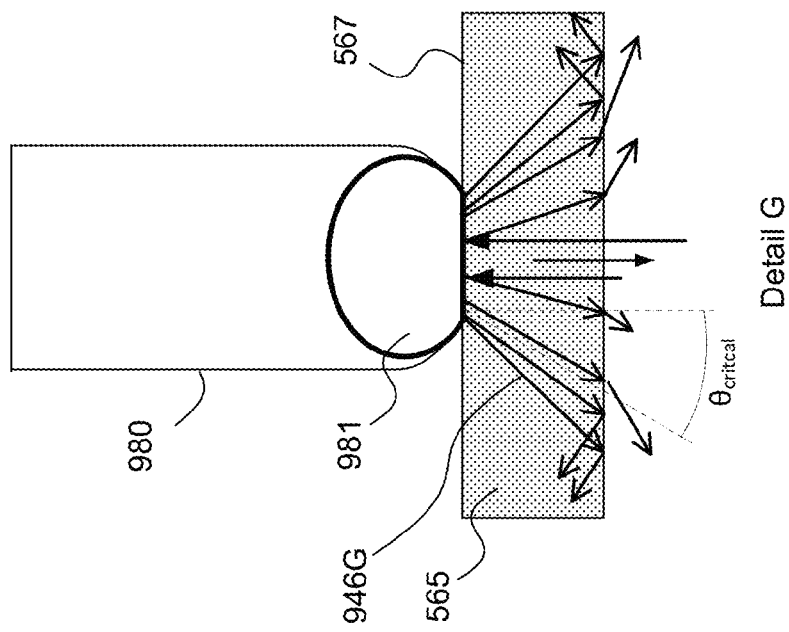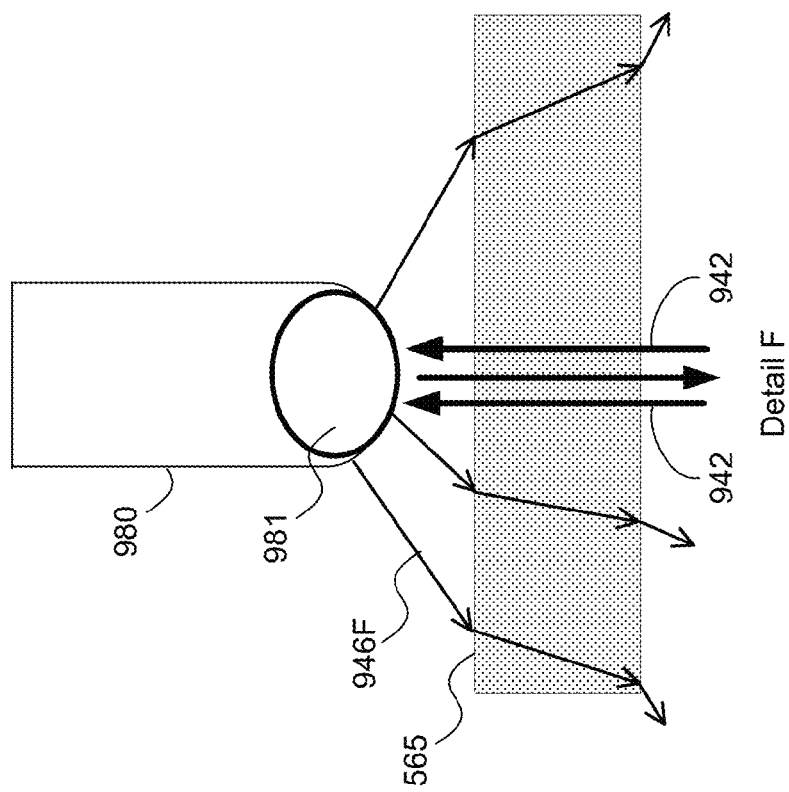
Figure 9

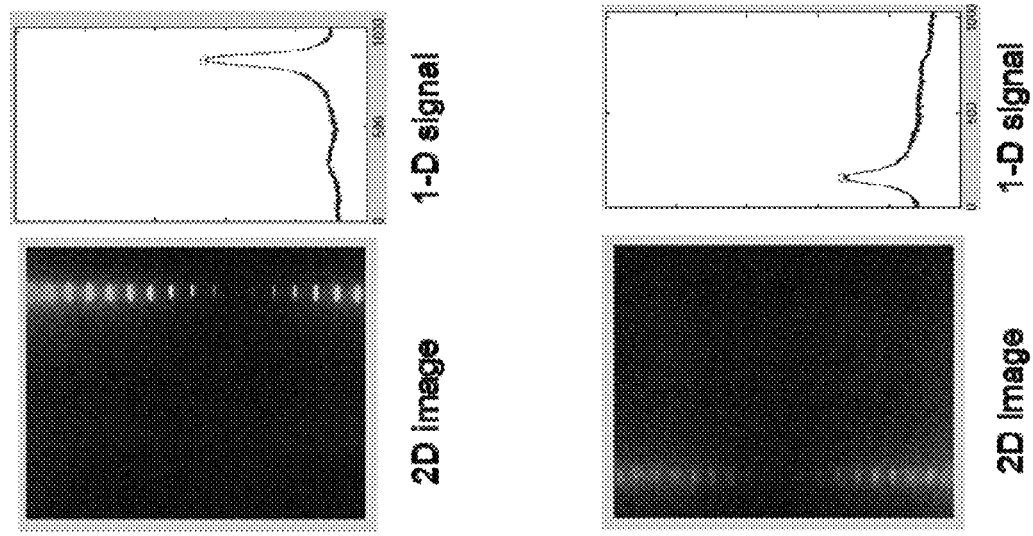
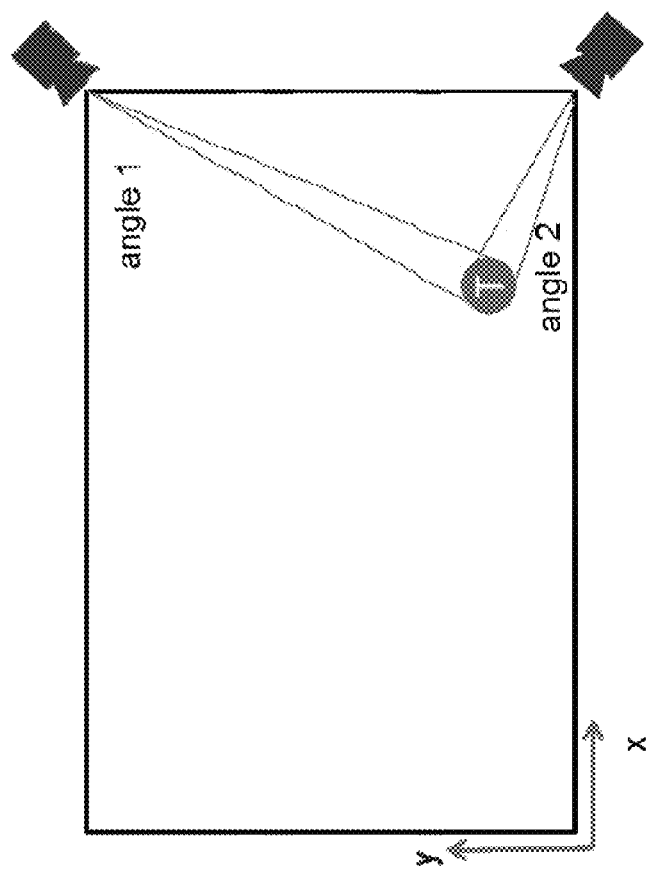
Figure 16

PRESSURE, ROTATION AND STYLUS FUNCTIONALITY FOR INTERACTIVE DISPLAY SCREENS

CROSS-REFERENCE TO RELATED APPLICATIONS

This disclosure claims priority to U.S. Provisional Patent Application No. 61/985,325, filed Apr. 28, 2014, entitled "PRESSURE, ROTATION AND STYLUS FUNCTIONALITY FOR INTERACTIVE DISPLAY SCREENS," and assigned to the assignee hereof. The disclosure of the prior Application is considered part of and is incorporated by reference in its entirety in this Patent Application.

TECHNICAL FIELD

This disclosure relates to techniques for providing touch responsive capabilities to devices, and, more specifically, an interactive display that provides a user input/output interface, controlled responsively respond to particular characteristics of touch interactions with the display.

DESCRIPTION OF THE RELATED TECHNOLOGY

The assignee of the present invention has developed optical based techniques for providing multi-touch functionality to display screen, especially those of large format. For example, application Ser. No. 61/947,971, "LARGE AREA INTERACTIVE DISPLAY SCREEN", hereby incorporated by reference into the present application in its entirety for all purposes, discloses techniques for providing touch responsive capabilities to devices with large display screens, including an interactive display that provides a user input/output interface, controlled responsively to a user's touch and/or multiple simultaneous touches. The advantage of these techniques with respect to other approaches, such as projected capacitive touch (PCT) and other optical methods, include scalability to large sizes with a small number of components, decreased sensitivity to electromagnetic interference and to ambient light, and a flat bezel that may avoid airgaps between the display cover glass and the frame.

SUMMARY

The systems, methods and devices of the disclosure each have several innovative aspects, no single one of which is solely responsible for the desirable attributes disclosed herein.

One innovative aspect of the subject matter described in this disclosure can be implemented in an apparatus that includes an interactive display, having a front surface that includes a viewing area, a planar light guide disposed proximate to and behind the front surface, a light source that emits one or both of visible and infrared light, and at least one photo sensing element coupled with the first planar light guide and disposed outside of or proximate to a periphery of the viewing area. The planar light guide is configured to receive scattered light, the received scattered light resulting from interaction between light emitted by the light source and an object in optical contact with the front surface. The photo sensing element is configured to detect at least some of the received scattered light and to output, to a processor, image data. The processor is configured to recognize, from the image data, one or both of a contact pressure and a rotational orientation of the object.

According to some implementations, an apparatus includes an interactive display, having a front surface that includes a viewing area, a planar light guide disposed proximate to and behind the front surface, a light source that emits one or both of visible and infrared light, and at least one photo sensing element coupled with the first planar light guide and disposed outside of or proximate to a periphery of the viewing area. The planar light guide is configured to receive light, the received light resulting from one or both of scattering of light emitted by the light source by an object in optical contact with the front surface, and light emitted by the object. The photo sensing element is configured to detect at least some of the received light and to output, to a processor, image data. The processor is configured to recognize, from the image data, one or both of a contact pressure and a rotational orientation of the object.

In some examples, the light source may emit light in a direction substantially orthogonal to the front surface. The light source may be configured as or include a backlight of a liquid-crystal or field sequential color display, the frontlight of a reflective display or light from an emissive display.

In some examples, the object may be a passive stylus or an appendage or a digit of a user.

In some examples, the object may be a passive stylus. The received light may result from scattering of light emitted by the light source by a nib of the passive stylus. The nib may have an elastomeric characteristic of deforming under pressure and a diffusely reflective surface. The processor may be configured to recognize, from the image data, one or more of a location, a contact pressure and an angular orientation of the passive stylus. The processor may be configured to recognize, from the image data, each of a location, a contact pressure and an angular orientation of the passive stylus.

In some examples, the object may be an active stylus, including a nib. The received light may result from light emitted by the active stylus through the nib. The nib may have an elastomeric characteristic of deforming under pressure. The nib may be configured to scatter the light emitted by the active stylus through the nib in substantially isotropic manner.

In some examples, the object may have an elastomeric characteristic of deforming under pressure, and image data of the detected light may include characteristic information related to a contact pressure applied between the object and the front surface. The processor may be configured to recognize and distinguish between individual contact pressures for multiple touch points from the characteristic information.

In some examples, the photo sensing element may include a photosensitive detector array or camera. The photo sensing element may be disposed within the plane or behind the plane of the planar light guide.

In some examples, the processor may be configured to recognize and distinguish between simultaneous or nearly simultaneous touches by both a stylus touch and a finger.

In some examples, the photosensing element may be a camera, including a lens having an optical axis, the camera being disposed with the optical axis approximately parallel to the front surface.

According to some implementations, an electronic display, has a front surface that includes a viewing area, a planar light guide disposed proximate to and behind the front surface, a light source that emits one or both of visible and infrared light, and at least one photo sensing element coupled with the first planar light guide and disposed outside of or proximate to a periphery of the viewing area. The planar light guide is configured to receive scattered light, the received scattered light resulting from interaction between light emitted by the light source and an object in optical contact with the front surface. The photo sensing element is configured to detect at least some of the received scattered light and to output, to a processor, image data.

In some examples, the processor may be configured to recognize, from the image data, one or both of a contact pressure and a rotational orientation of the object. In some examples, the processor may be configured to recognize, from the image data, each of a location, a contact pressure and an angular orientation of the object.

In some examples, the object may have an elastomeric characteristic of deforming under pressure, and image data of the detected light includes characteristic information related to a contact pressure applied between the object and the front surface.

In some examples, the object may be a passive stylus, the received scattered light may result from interaction between light emitted by the light source and a nib of the passive stylus, and the nib may have an elastomeric characteristic and a diffusely reflective surface.

According to some implementations, an apparatus includes an interactive display, having a front surface that includes a viewing area, a light source that emits one or both of visible and infrared light, at least one photosensing element disposed outside of or proximate to a periphery of the viewing area, and means, disposed proximate to and behind the front surface, coupled with the at least one photosensing element, for receiving light, the received light resulting from one or both of: interaction between light emitted by the light source and an object in optical contact with the front surface, and light emitted by the object. The photosensing element is configured to detect at least some of the received light and to output, to a processor, image data. The processor is configured to recognize, from the image data, one or both of a contact pressure and a rotational orientation of the object.

According to some implementations, a method includes detecting, with a photosensing element, received light, the received light resulting from one or both of: interaction between light emitted by the light source and an object in at least partial optical contact with a front surface of a display cover glass of an interactive display, and light emitted by the object, outputting image data from the photosensing element to a processor, and recognizing, with a processor, from the image data, one or both of a contact pressure and a rotational orientation of the object.

In some examples, the processor may be configured to make a determination, from the image data, of a location of the object.

In some examples, the processor may be configured to make the determination by one or more of: measuring azimuth angle and range of the object with respect to the photosensing element; measuring azimuth angles of the object with respect to a plurality of photosensing element; and measuring ranges of the object with respect to a plurality of photosensing element.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

FIG. 4 illustrates how image data of detected light may include information related to contact pressure.

FIG. 9 illustrates examples of interaction of a passive stylus with a planar light guide, according to some implementations.

FIG. 16 illustrates how azimuthal coordinates of the touch location with respect to each of two photosensitive elements, may be used to obtain X-Y coordinates of the touch location, in some implementations.

DETAILED DESCRIPTION

Figure 1:
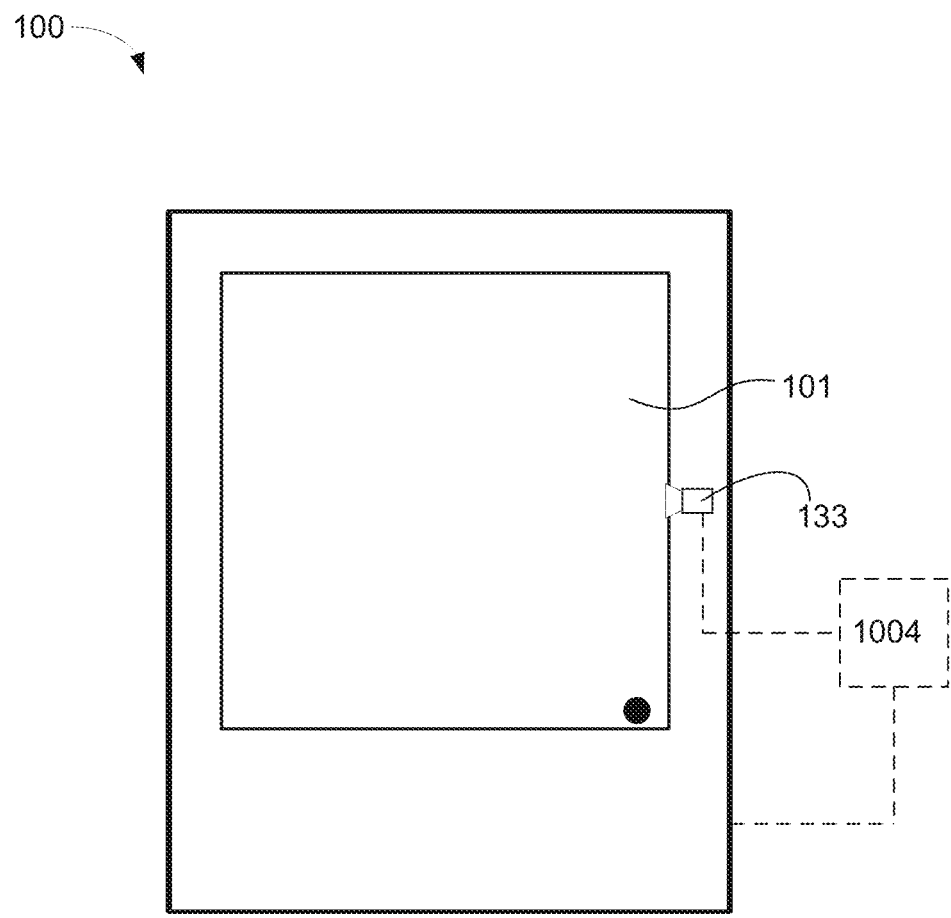
FIG. 1 illustrates a simplified block diagram of an interactive display, according to an implementation.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device or system that can be configured to display an image, whether in motion (e.g., video) or stationary (e.g., still image), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, GPS receivers/navigators, cameras, MP3 players, camcorders, game consoles, wrist watches, clocks, calculators, television monitors, flat panel displays, electronic reading devices (i.e., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS), microelectromechanical systems (MEMS) and non-MEMS applications), aesthetic structures (e.g., display of images on a piece of jewelry) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Described herein below are new techniques for providing an interactive electronic display that provides a user input/output interface, controlled responsively to particular characteristics of touch interactions with the display. The characteristics are determined using optical techniques that add little to the cost, size and complexity of the display. In various implementations, the interactive display is configured to be responsive to one or more of contact pressure and angular orientation of a user's touch. The interactive display may be responsive to either or both of a touch of a human finger or a touch made by way of an active or passive stylus.

Particular implementations of the subject matter described in this disclosure can be implemented to realize one or more of the following potential advantages. Relative to the prior art, the presently disclosed techniques enable a more robust and diverse user interface. For example, in some implementations, the location and characteristics of multiple simultaneous touches on the interactive display may be distinguished. The disclosed techniques enable the interactive display to detect and respond to particular characteristics of touch interactions with the display, such as the force or pressure ("contact pressure") with which a touch is applied and angular orientation of the touch. Responsiveness to the contact pressure and angular orientation of a user's touch, in addition to the touch location, provides an enhanced user interface desirable for a number of applications. In some implementations, for example, the contact pressure information may be used in connection with software applications running on the interactive display such as drawing or painting programs, musical instrument simulation, and games. In some implementations, the interactive display is configured to detect and respond to rotational orientation of a finger touch. The rotational orientation information may be used for rotating the display orientation from portrait to landscape, for example, depending on how the user is holding a mobile device and also for gaming and other applications. It may also be used to distinguish between multiple users, and/or to enable recognition of new gestures for working with on-screen objects. In some implementations, the interactive display is operable with a stylus pen, which may be an active (light emitting) stylus or a passive (light reflective) stylus.

One innovative aspect of the subject matter described in this disclosure can be implemented in an interactive display that includes one or more photosensing elements such as, for example, cameras, each mounted within the plane or behind the plane of a display cover glass. The photosensing element(s) may output image data from which the location(s), contact pressure and/or angular orientation of a touch or of simultaneous multiple touches may be determined.

In some implementations, an apparatus or electronic device may cooperate with the interactive display to provide an input/output (I/O) interface to a user of the apparatus. The interactive display has a front surface that includes a viewing area. The electronic device may include the interactive display or be electrically or wirelessly coupled to the interactive display. The apparatus may include a processor, a planar light guide, a light source, and one or more photosensing elements, photodetector arrays or cameras. The planar light guide may be disposed proximate to and behind the front surface. In some implementations, the planar light guide may include a cover glass or lens disposed proximate to and in parallel with the display layer of a mobile device computer monitor, television or the like, such that the planar light guide is disposed between the display layer and a user. A better understanding of the term "planar light guide" as the term is used herein and in the claims, may be obtained by referring to application Ser. No. 13/480,377, "FULL RANGE GESTURE SYSTEM", assigned to the assignee of the present invention, the disclosure of which is hereby incorporated by reference into the present application in its entirety for all purposes.

The one or more cameras may be disposed proximate to a periphery of the viewing area. The cameras in this system may be used for a dual purpose of touch location sensing as described in application Ser. No. 61/947,971, "LARGE AREA INTERACTIVE DISPLAY SCREEN" assigned to the assignee of the present invention, the disclosure of which is hereby incorporated by reference into the present application in its entirety for all purposes. When an object, such as a user's finger, a stylus, or other user-controlled object to be imaged, contacts the front surface of the interactive display, light scattered from the object may undergo total internal reflection (TIR) within the planar light guide. At least some of the light, having undergone TIR, may reach the one or more cameras. The cameras may detect such TIR'd light and output to the processor image data representative of the detected TIR'd light. The processor (using special algorithms) may recognize, from the image data, an instance and location of a user touch, and may control one or both of the interactive display and the electronic device, responsive to the user touch.

FIG. 1 illustrates a simplified block diagram of an interactive display, according to an implementation. An interactive display 100 includes a display cover glass 165 (FIG. 2) with a front surface 167 (FIG. 2) that includes a viewing area 101. The electronic display 100 includes at least one photosensing element 133 that is configured to detect light. As will be explained in more detail hereinbelow, the photosensing element 133 may detect scattered light that results from interaction of light with an object 150 (FIG. 2) when the object 150 is at least partially in optical contact with the front surface 167.

The photosensing element 133 may output, to a processor 1004, image data. In some implementations, for example, the photosensing element 133 may output fingerprint image data to the processor 1004. In some implementations, as a further example, the photosensing element 133 may output image data representative of features of an active or passive stylus. The processor 1004 may be communicatively coupled with the photosensing element 133 and with other elements of the interactive display 100. In some implementations, the processor 1004 may be an integral part of the electronic display 100. In other implementations, as suggested by FIG. 1, the processor 1004 may be configured separately from the electronic display 100. In some implementations, the processor may be remotely located in, for example, a remote server.

In some implementations, the processor 1004 may be configured to recognize, from the image data, one or both of a contact pressure and a rotational orientation of the object. In some implementations, the image data includes fingerprint image data and the processor 1004 may be configured to compare fingerprint image data received from the photosensing element 133 with fingerprint image data of known and/or authorized users, as disclosed in patent application entitled "DISPLAY-INTEGRATED USER-CLASSIFICATION, SECURITY AND FINGERPRINT SYSTEM", filed concurrently with the present application, the disclosure of which is hereby incorporated by reference into the present application in its entirety for all purposes.

In some implementations, the object has an elastomeric characteristic of deforming under pressure. For example, the object may be a human digit, or a stylus with a deformable nib, the nib having an elastomeric surface material, such as rubber or plastic. In such implementations, image data of the detected light may include characteristic information related to a contact pressure applied between the object and the front surface 167 and the processor 1004 may be configured to recognize and distinguish between individual contact pressures for multiple touch points from the characteristic information.

In some implementations, the processor 1004 may be configured to recognize and distinguish between simultaneous or nearly simultaneous touches by both a stylus touch and a finger.

Figure 2:
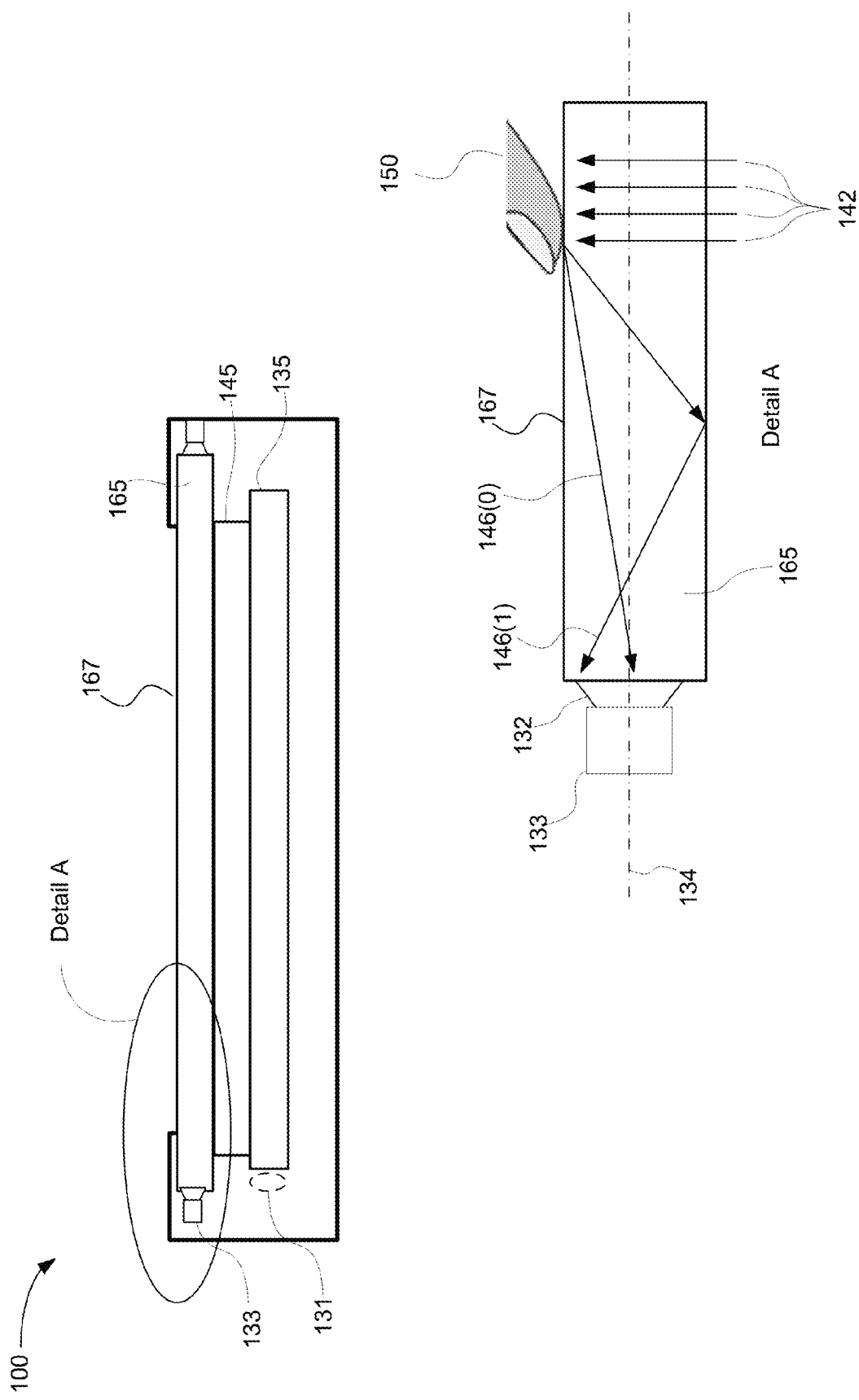
FIG. 2 illustrates a cross-sectional elevation view of the interactive display according to an implementation.

FIG. 2 illustrates a cross-sectional elevation view of the interactive display according to an implementation. Interactive display 100 includes a first planar light guide 165 (which may be referred to herein also as a "cover lens" or a "cover glass" and may be disposed over a display on a mobile device, monitor, or television, for example.). The first planar light guide 165 may be disposed proximate to and behind front surface 167 of the interactive display 100. In the illustrated implementation, a backlight 135 (which may be referred to herein also as a "light source") is disposed behind the first planar light guide 165. A display layer 145 may be disposed between the first planar light guide 165 and the backlight 135. In the illustrated implementation, the backlight 135 is configured to emit light 142 in a direction substantially orthogonal to the front surface 167. The light 142 may include visible and/or infrared light.

In the illustrated implementation, light source 135 is configured as a back light (i.e., the light source 135 is "behind" display layer 145, such that the display layer 145 is disposed between the light source 135 and the first planar light guide 165). In other implementations, however, the light source 135 may be configured as a front light (i.e., the light source 135 may be "above" display layer 145, such that the light source 135 is disposed between the display layer 145 and the first planar light guide 165). More generally, it will be appreciated that the light source 135 may be or include a backlight of a liquid-crystal or field sequential color display, the front-light of a reflective display (e.g. an interferometric modulator (IMOD) display), or light emitted by an emissive display (e.g. organic light emitting diode display), or an infrared light emitted underneath and through an art-work area of the cover glass 165 that is opaque to visible light.

In some implementations, the light source 135 may be configured as a second planar light guide that incorporates a light turning arrangement that reflects light received from an external light emitting element 131 in a direction having a substantial component orthogonal to the front surface 167. The light emitting element 131 may be, for example, a light emitting diode (LED). In some implementations, the light emitting element 131 may include a plurality of LEDs disposed around a perimeter of the light source 135. The light emitting element 131 may emit infrared, red, blue, green, or another color or combination of colors, or white light.

As indicated above, the interactive display 100 includes at least one photosensing element 133. The photosensing element may include, for example, a two dimensional pixel array with a lens, pinhole, or grating ("cameras"). In some implementations, the photosensing element 133 may be configured as a one dimensional pixel array aligned along the in-plane direction of the first planar light guide 165 with a lens, pinhole or grating ("1D cameras").

In some implementations, at least one of the photosensing element 133 is a video graphics array (VGA) micro camera. In some implementations, the VGA micro camera may include a lens approximately 500 µm diameter and be included in a sensor package of less than 4 mm diameter. As a result, photosensing element 133 may be located in a coplanar arrangement with first light guide 165 without adding appreciably to a stack height of interactive display 100.

Referring now to Detail A of FIG. 2, light 142 may pass through the first planar light guide 165 and interact with the object 150. The object 150 is at least partially in optical contact with the top surface of first planar light guide 165. The object 150 may be a finger or other appendage of the user or another object having a surface to be imaged, such as a stylus, or a document or electronically displayed image that includes a bar code identifier or a cryptographic watermark detectable by a visible or IR light camera. Scattered light 146 results from interaction of the light 142 with the object 150. Some of the scattered light 146, as illustrated by ray trace 146(0) may travel to the photosensing element 133 and be detected by the photosensing element 133 without being internally reflected by the first planar light guide 165. At least some of the scattered light 146 may undergo TIR. For example, as illustrated by ray trace 146(1) some of the scattered light may undergo a single internal reflection before being detected by the photosensing element 133. It will be appreciated that some of the scattered light may undergo two, three or more internal reflections before being detected by the photosensing element 133. The photosensing element 133 may output image data of the detected light to the processor 1004 (FIG. 1).

Referring still to Detail A of FIG. 2, it should be noted that the photosensing element 133 may be a camera, including a lens 132 having an optical axis 134. In some implementations, the photosensing element 133 may be disposed such that the optical axis 134 is approximately parallel to the front surface 167.

Figure 3:
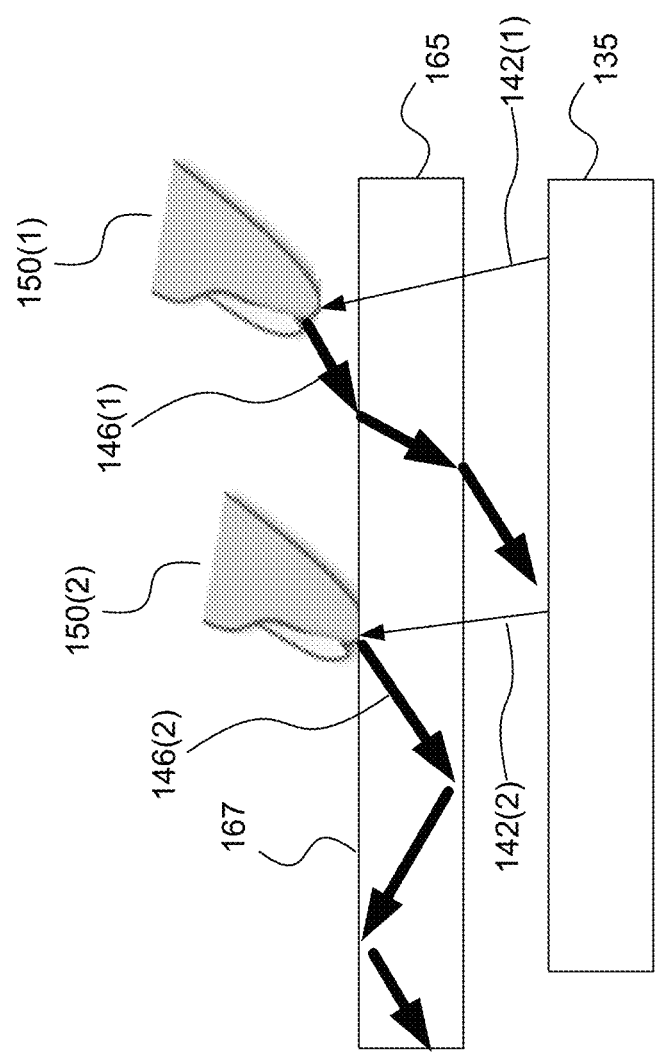
FIG. 3 illustrates how light scattered from an object may interact with a planar light guide.

FIG. 3 illustrates how light scattered from an object may interact with a planar light guide. In the illustrated example, object 150(1) is not in optical contact with the front surface 167. As a result, the light 142(1), incident upon the surface of the object 150(1) is scattered, and the scattered light 146(1) is refracted through the first planar light guide 165. In the illustrated example, object 150(2) is in optical contact with the front surface 167 and, as a result of this contact, the scattered light 146(2) from the object 150(2) may undergo TIR within the first planar light guide 165 and be guided toward and detected by one or more photo sensing elements (not illustrated).

Where object 150 has an elastomeric characteristic of deforming under pressure, such as a human digit, or an artificial material or arrangement with elastomeric properties, image data of the detected light may include information related to a force or pressure ("contact pressure") with which the object 150 contacts the front surface. FIG. 4 illustrates how image data of detected light may include information related to contact pressure. Because of the ridge structure of human skin (or the surface roughness of an artificial object), when a touch is applied to the planar light guide 165 with minimal contact pressure (Detail B), only a relatively small proportion of the surface of the object 150 may actually be in optical contact with the glass. The intensity of the scattered light that is captured by the cover glass is proportional to the area of contact. As the contact pressure increases (Detail C), the contact area also increases as air gaps are eliminated or reduced in size, and the intensity of the captured scattered light may, correspondingly, increase. In addition, as more contact pressure is applied (Detail D), the soft tip or pad of the finger or elastomeric object compresses, and the size of the object region that is in contact with the front surface increases. As a result, a wider "dot" may be observed in the image data output by the photosensing element 133. In some implementations, the image data output by the photosensing element 133, including signal intensity levels and/or the size of observed dots are used to determine the contact pressure applied by the object 150. A computer algorithm executed by the processor 1004 may interpret the camera images to determine the pressure applied to one or more touch points, using the intensity of the signal and/or the size of the dot.

In some implementations, the contact pressure may be determined individually for multiple finger touch points.

Figure 5:
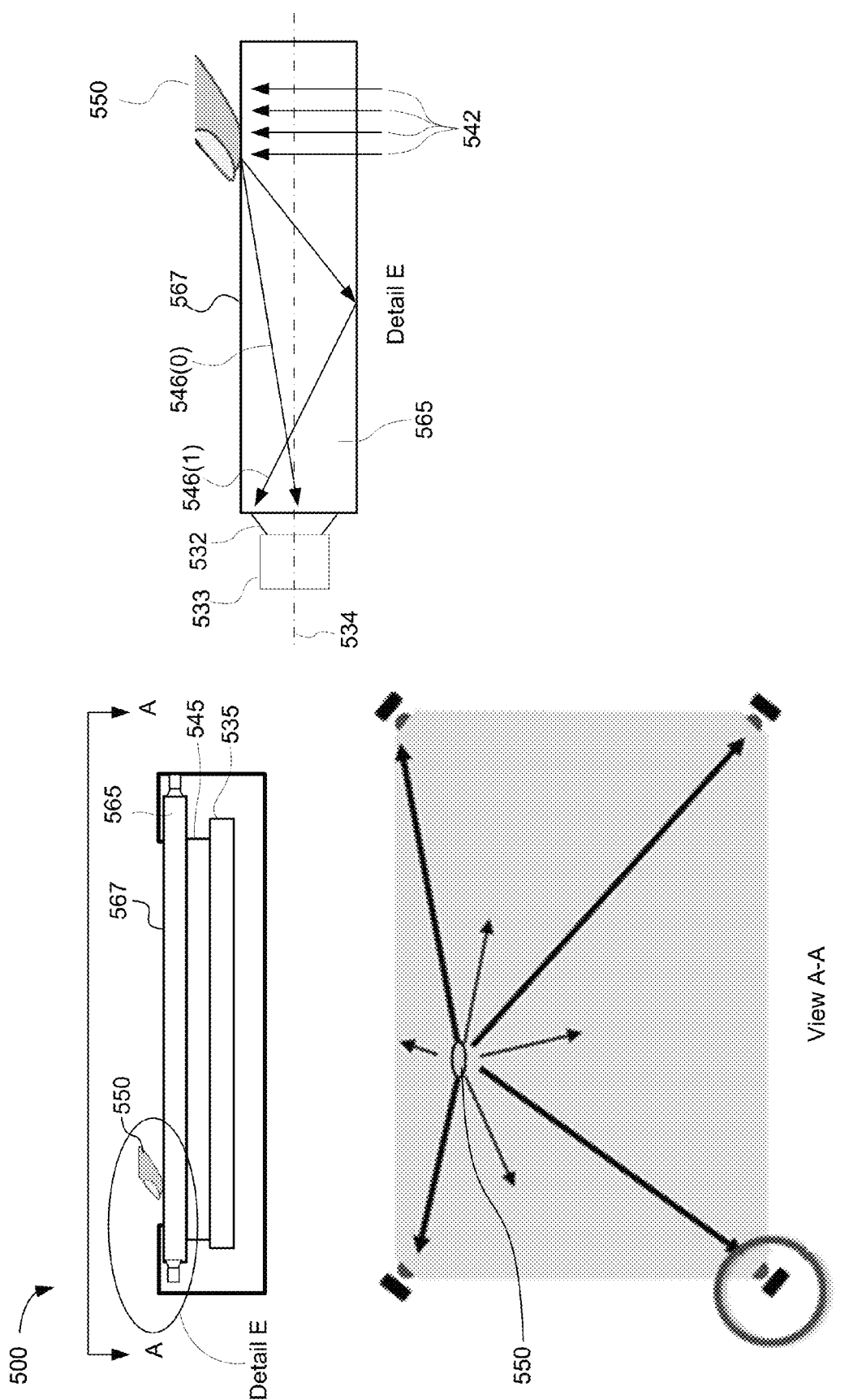
FIG. 5 illustrates how image data of detected light may include rotational orientation information, according to an implementation.

FIG. 5 illustrates how image data of detected light may include rotational orientation information, according to an implementation. In the illustrated implementation, interactive display 500 is configured to provide a rotational orientation sensing capability, in the following manner. Interactive display 500 includes a first planar light guide 565 (which may be referred to herein also as a "cover lens" or a "cover glass" and may be disposed over a display on a mobile device, monitor, or television, for example), a light source or backlight 535, and one or more photosensing elements 533 located around the periphery of the planar light guide 565. The photosensing elements 533 may include two dimensional pixel arrays with a lens, pinhole, or grating.

The first planar light guide 565 may be disposed proximate to and behind front surface 567 of the interactive display 500. In the illustrated implementation, a light source 535 (which may be referred to herein also as a "backlight") is disposed behind the first planar light guide 465. Display layer 545 may be disposed between the first planar light guide 565 and the light source 535.

The light source 535 may emit visible and/or infrared light in a direction having a substantial component orthogonal to the front surface 567, and may be configured as or include a liquid-crystal or field sequential color display, the front-light of a reflective display (e.g. an interferometric modulator (IMOD) display, light from an emissive display (e.g. organic light emitting diode display).

Referring still to FIG. 5, light 542 from the light source 535 may interact with a surface of the object 550 that is contacting front surface 567. When a portion of a surface of object 550 comes into optical contact with the front surface 567, it scatters light 546 into the light guide, which is guided and then detected by one or more photosensing elements 533. The photosensing elements 533 may output to a processor (not illustrated) image data of the detected light. In some implementations, the processor may be an integral part of interactive display 500, but this is not necessarily so. In other arrangements, the processor may be remotely located in, for example, a remote server.

Where the object 550 is a human finger or thumb, or a similarly shaped artificial object, it will make contact with the front surface 567 in an oval-shaped region having a length to width aspect ratio measurably larger than one, as may be observed in View A-A of FIG. 5. As a result, a skew angle of the oval in the perspective image at the camera, which depends on the relative orientation of the camera with the orientation of the object 550, may be identified, as will be described in more detail hereinbelow.

Referring now to Detail E of FIG. 5, light 542 may pass through first planar light guide 565 and interact with object 550. Object 550 is at least partially in optical contact with the top surface 567 of first planar light guide 565. Scattered light 546 results from interaction of the light 542 with the object 550. Some of the scattered light 546, as illustrated by ray trace 546(0) may travel to the photo sensing element 533 and be detected by the photo sensing element 533 without being internally reflected within the planar light guide 565. At least some of the scattered IR light 546 may undergo TIR. For example, as illustrated by ray trace 546(1) some of the scattered light may undergo a single internal reflection before being detected by the photo sensing element 533.

It will be appreciated that some of the scattered light may undergo two, three or more internal reflections before being detected by the photo sensing element 533. As a result, multiple discrete reflections of an image of the object 550 may be detected by the photo sensing element 533. Generation of these multiple discrete reflections may be referred to herein as the kaleidoscope effect.

Figure 6:
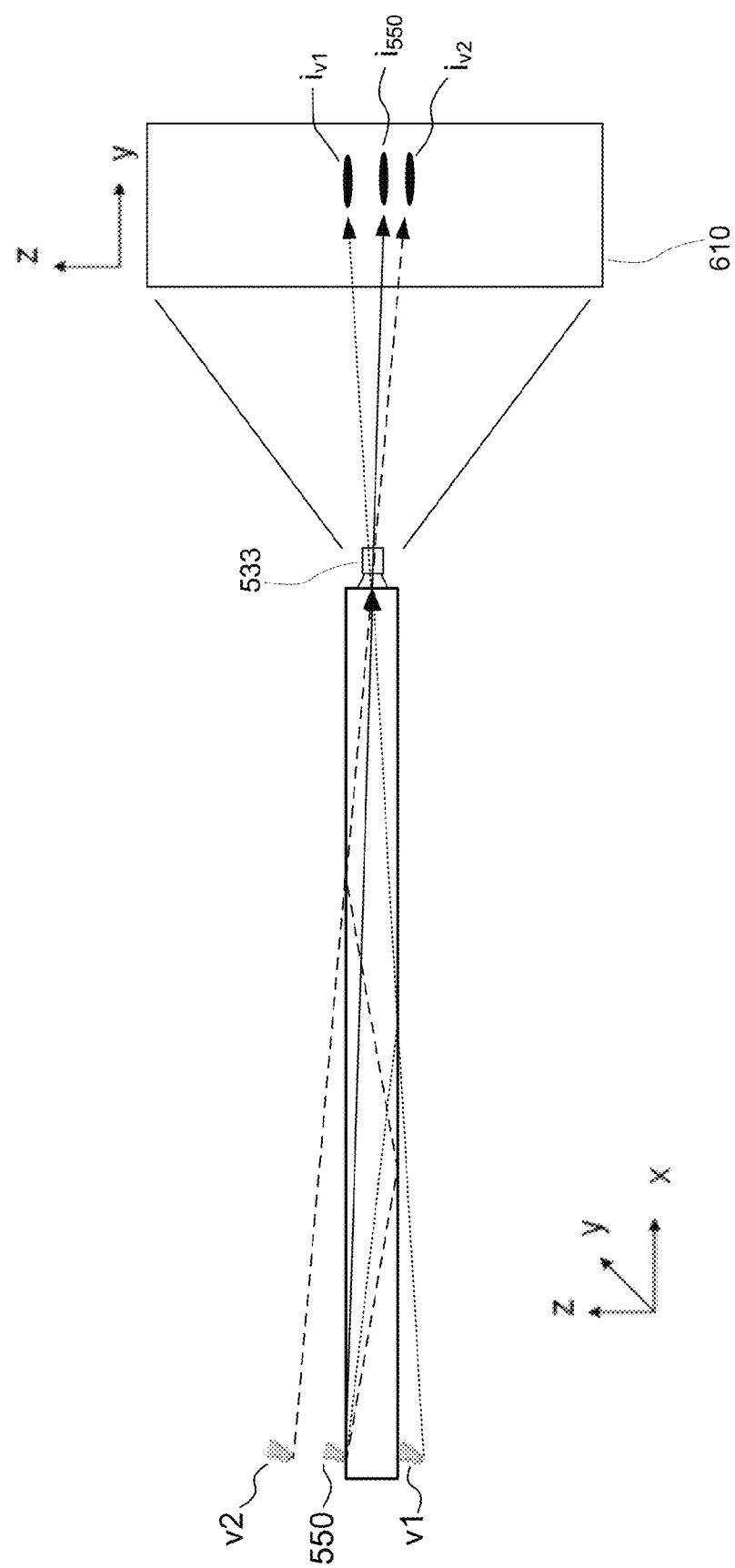
FIG. 6 illustrates an example of the kaleidoscope effect.

FIG. 6 illustrates an example of the kaleidoscope effect. More particularly, FIG. 6 illustrates how each of multiple images registered within a field of view 610 of the photosensing element 533 corresponds to light that is scattered from an object 550 at a different angle that may be related to a respective virtual object location. For example image $i_{550}$ corresponds to a direct image of object 550. Image $i_{v1}$ results from light rays that have undergone a single internal reflection and corresponds to a virtual object location v1. Image $i_{v2}$ results from light rays that have undergone two internal reflections and corresponds to a virtual object location v2. Although for clarity of illustration only three images, images $i_{550}$, $i_{v1}$, and $i_{v2}$, are depicted in FIG. 6, a substantially larger number of images may ordinarily be expected to result from the kaleidoscope effect.

Figure 7:
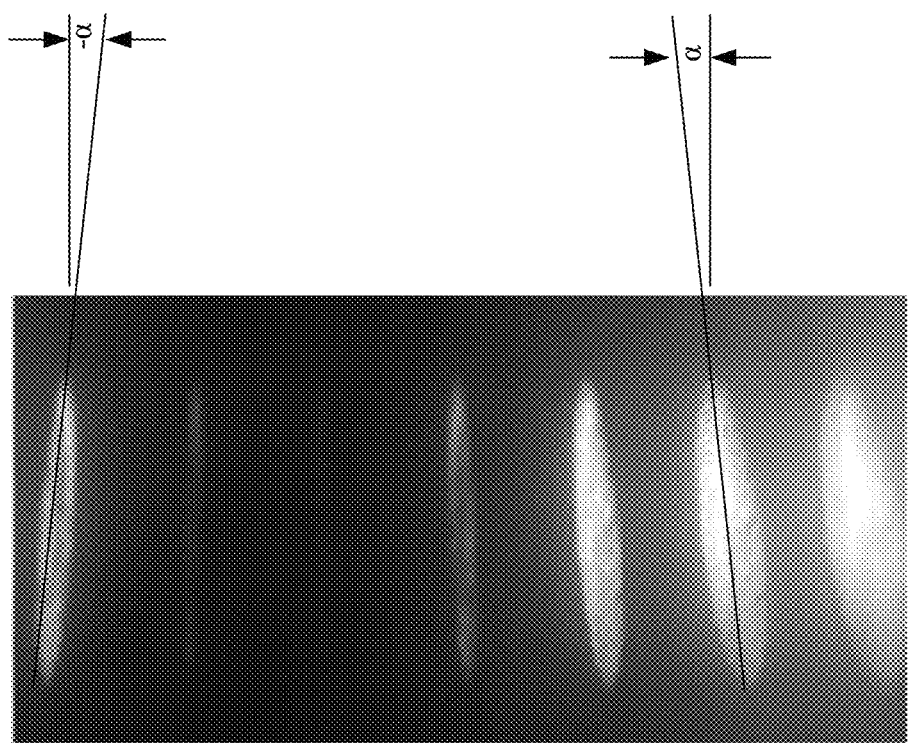
FIG. 7 illustrates an example of an image, obtained using the presently disclosed techniques.
Figure 8:
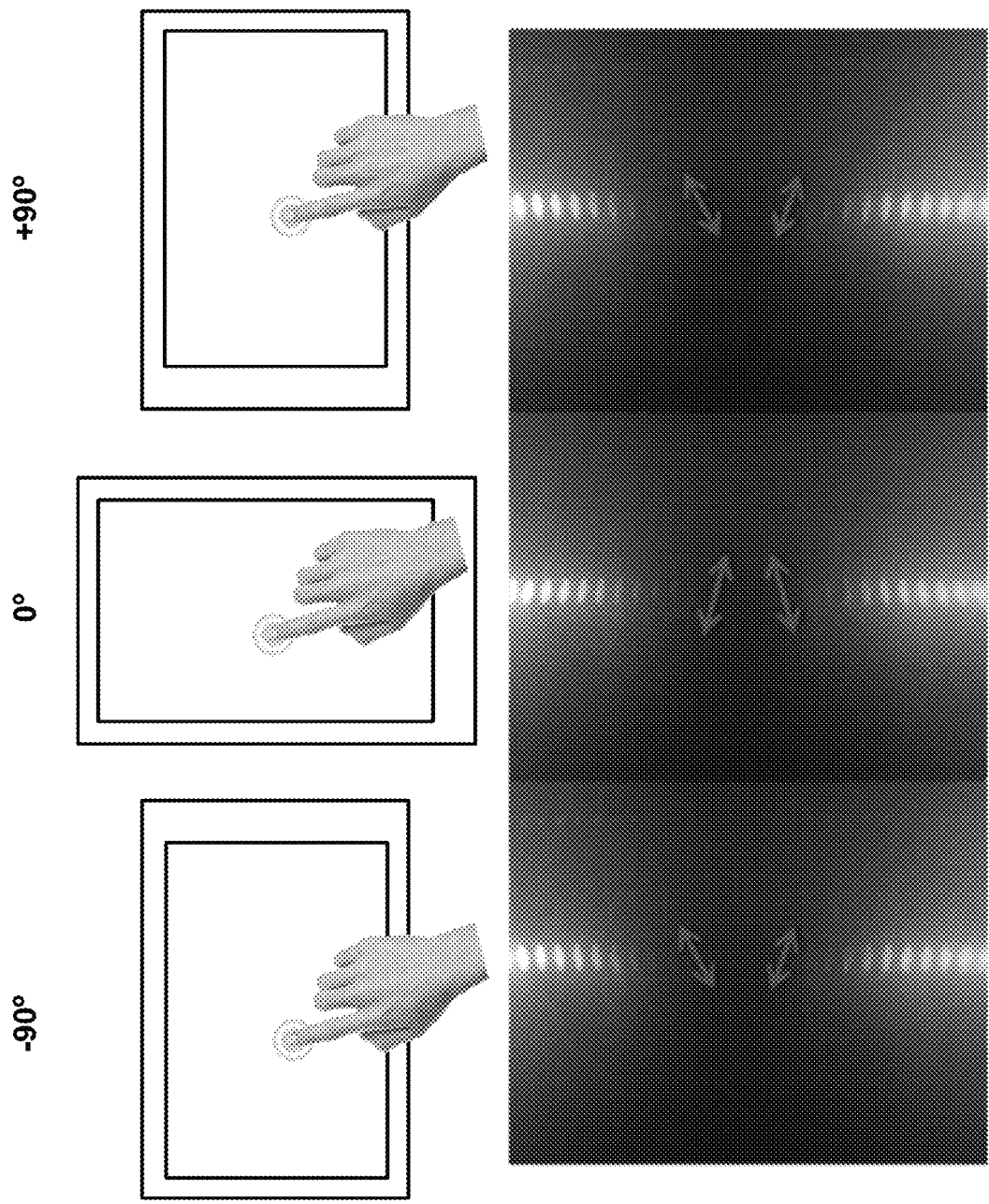
FIG. 8 illustrates how image data of detected light may be used to obtain rotational orientation information, according to an implementation.

FIG. 7 illustrates an example of an image, obtained using the presently disclosed techniques. The presence of a detectable skew angle α of the oval-shaped contact region of object 550 should be noted. It is contemplated that a detected skew angle α may be correlated with a rotational orientation of the object 550. For example, a computer algorithm executed by the processor 1004 may interpret the image data to determine the rotational orientation of the object 550. In some implementations, the processor 1004 may determine a dominant angle of skew in the imaged ovals, and correlate that with a rotational orientation of the object 550. FIG. 8 illustrates how image data of detected light may be used to obtain rotational orientation information, according to an implementation. The processor 1004 may also use the rotational orientation sensed to respond to a rotation gesture and/or to rotate the view of the display.

FIG. 9 illustrates examples of interaction of a passive stylus with a planar light guide, according to some implementations. As described herein in more detail below, stylus 980 may be configured with a "deformable nib". Similarly to implementations described hereinabove, an interactive display may include a planar light guide 565, a light source (not illustrated), and one or more photosensing elements (not illustrated) located around the periphery of the planar light guide 565. The planar light guide 565 may be configured as a cover-glass (or "cover lens") disposed over a display on a mobile device, monitor, or television, for example.

The photosensing elements may include two dimensional pixel arrays with a lens, pinhole, or grating ("cameras"), one dimensional pixel arrays aligned along the in-plane direction of the planar light guide 565 with a lens, pinhole or grating ("1D cameras"), or individual photo detectors.

The light source may emit visible and/or infrared light and be configured as or include a liquid-crystal or field sequential color display, the front-light of a reflective display (e.g. an interferometric modulator (IMOD) display, light from an emissive display (e.g. organic light emitting diode display).

In the illustrated implementation, stylus 980 is configured as a "passive" stylus, by which is meant that a touch recognition technique described in connection with FIG. 9 relies primarily on light passively reflected or scattered from the stylus 980 and does not require that the stylus 980 include its own light source. The stylus 980 may be configured as a rod or pen shaped device similar to a traditional writing instrument and may include a nib 981. The nib 981 may be configured to have an elastomeric characteristic of deforming under pressure, and may include a surface configured to diffusively scatter light impacting the surface. The deformable nib may be configured to improve optical contact between the stylus and the light guide.

Referring still to FIG. 9, a better understanding of the presently disclosed techniques may be obtained by comparing Detail F with Detail G. In order for light 946 reflected by the nib 981 to undergo TIR within the planar light guide 565, such light must enter the planar light guide 565 at an angle larger than the critical angle θ. Detail F illustrates an example where the nib 981 is not in optical contact with the planar light guide 565, while Detail G illustrates an example where the nib 981 is in optical contact with the planar light guide 565. In Detail F, when light 942 interacts with the nib 981, scattered light 946F, resulting from the interaction, undergoes a significant amount of refraction as it enters planar light guide 565. As a result, most, or all of such light enters planar light guide 565 at an angle less than critical angle θ (roughly 42 degrees for a glass or plastic/air interface), and therefore does not undergo TIR but instead exits the planar light guide 565 rather than being guided toward a photosensing element such as a camera (not illustrated) or photo detector (not illustrated). However, when the nib 981 is in optical contact with the planar light guide, as illustrated in Detail G, light 946G, scattered from the nib 981 experiences little or no refraction, and at least a substantial part of the light 946G undergoes TIR within the planar light guide 565, which may guide the light to the photosensing element.

By configuring the nib 981 as a deformable nib, having elastomeric characteristics, a significant increase may be achieved in the amount of scattered light that is detected. Furthermore, the stylus 980, together with the deformable nib 981 may be used in the arrangements where contact pressure sensing is desired, as described above in connection with FIGS. 2-4.

At least some of the light, having undergone TIR, may reach the one or more photosensing elements. The photosensing elements may detect such TIR'd light and output to the processor image data representative of the detected TIR'd light. The processor may recognize, from the image data, an instance and location of a stylus touch, and may control one or both of the interactive display and the electronic device, responsive to the stylus touch.

In some implementations, the nib 981 may be configured to provide some minimal level of deformability such that its shape conforms, upon contact with the front surface 567 of the planar light guide 565, to the microscopic and macroscopic surface geometry of the front surface 567.

In some implementations, the nib 981 includes, near or at an exterior surface, an elastomer layer. Alternatively or in addition, the front surface 567 of the planar light guide 565 may include an elastomeric layer. In some implementations, the elastomeric layer may have a thickness in the range of five microns to 1000 microns. The elastomeric layer may be disposed on a surface of a harder material from which a body of the nib 981 is formed. In some implementations, the body of the nib 981 may also be composed of an elastomer material.

In some implementations, the processor may be configured to recognize that a stylus rather than a finger has touched the light guide 565 because, for example, a size of an image captured by the camera resulting from a stylus touch may be different from that resulting from a finger touch. For example, the nib 981 may appear as a small bright dot, rather than an extended oval. In some implementations, the nib 981 may be a specific shape that may be detected by the camera (e.g. a star shape).

In some implementations, the processor may be configured to recognize and distinguish between, simultaneous or nearly simultaneous touches by both a stylus touches and a finger.

Figure 10:
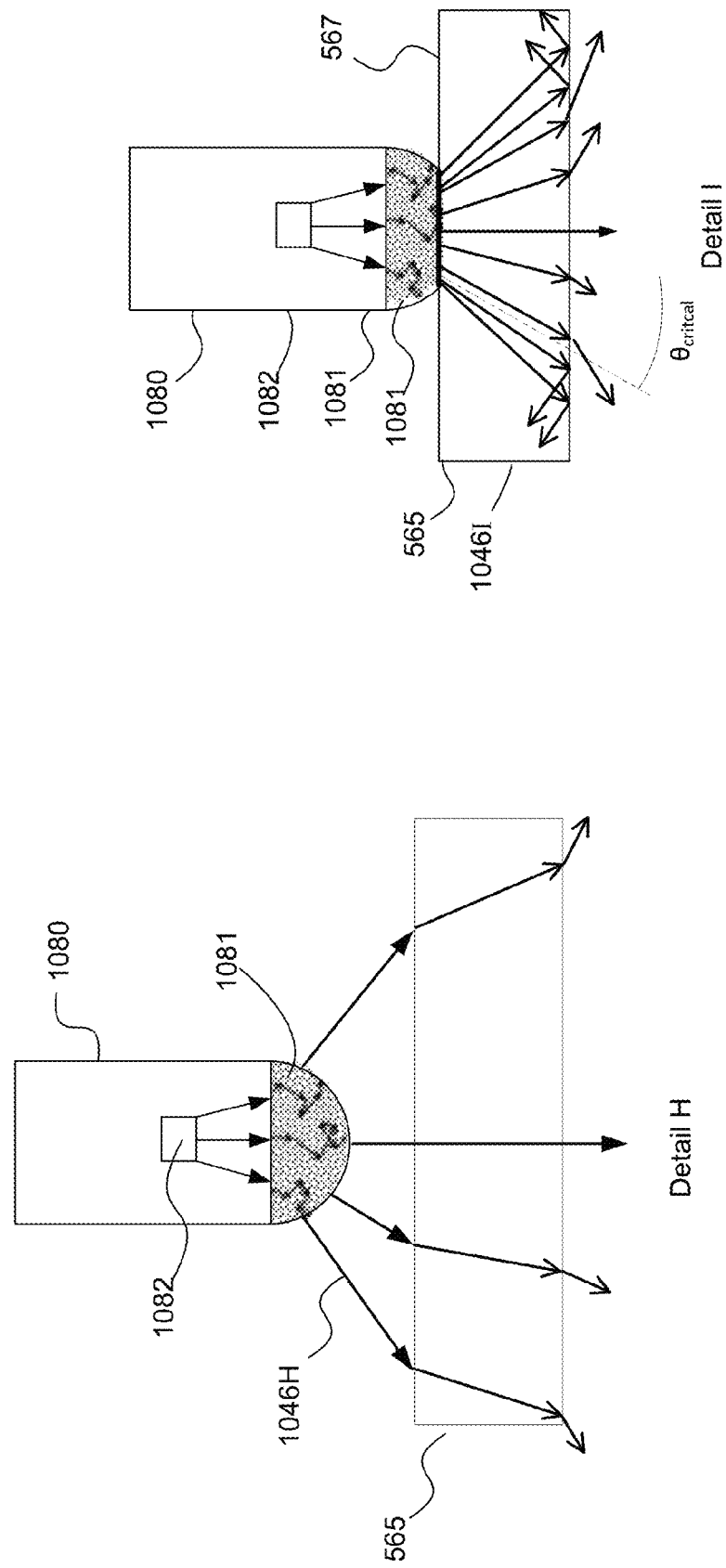
FIG. 10 illustrates examples of interaction of an active stylus with a planar light guide, according to some implementations.

FIG. 10 illustrates examples of interaction of an active stylus with a planar light guide, according to some implementations. In the illustrated implementation, an interactive display may be configured to detect and respond to touches from a stylus 1080 that includes a light source 1082 and which may be configured with a deformable nib 1081. Similarly to implementations described hereinabove, the interactive display may include a planar light guide 565 and one or more photosensing elements (not illustrated). The photosensing elements may be located around the periphery of the planar light guide 565, for example. The planar light guide 565 may be configured as a cover-glass (or "cover lens") disposed over a display on a mobile device, monitor, or television, for example.

The photosensing elements may include two dimensional pixel arrays with a lens, pinhole, or grating ("cameras"), one dimensional pixel arrays aligned along the in-plane direction of the planar light guide 565 with a lens, pinhole or grating ("1D cameras"), or individual photo detectors.

In the illustrated implementation, stylus 1080 is configured as an "active" stylus, by which is meant that a touch recognition technique described in connection with FIG. 10 relies primarily on light emitted by the light source 1082 of stylus 1080 and does not require that the interactive display include its own light source. In some implementations, the light source 1082 may be or include a light emitting diode (LED). Stylus 1080 may be configured as a rod or pen shaped device and includes nib 1081. The nib 1081 may be at least partially transparent to light emitted by the light source 1082. More particularly, it is contemplated that the nib 1081 will diffusively pass light emitted by light source 1082 across a wide range of angles. As a result, there may be no need for a diffusive layer of the interactive display to "turn" light into the light guide 565.

In some implementations, the nib 1081 may be configured to have an elastomeric characteristic of deforming under pressure. The deformable nib may be configured to improve optical contact between the stylus and the light guide. This enables an optical coupling preserving the directionality of the diffused light as it propagates from the nib 1081 into the planar light guide 565. The large angular range of light emitted from the nib 1081 may include angles that exceed the critical angle associated with the cover glass/air interface. Such light is trapped in the light guide by virtue of total internal reflection. Some of this light is collected by peripheral sensors enabling the stylus functionality.

Referring still to FIG. 10, a better understanding of the presently disclosed techniques may be obtained by comparing Detail H with Detail I. In order for light exiting nib 1081 to undergo TIR within the planar light guide 565, such light must enter the planar light guide 565 at an angle larger than the critical angle θ. Detail H illustrates an example where the nib 1081 is not in optical contact with the planar light guide 565, while Detail I illustrates an example where the nib 1081 is in optical contact with the planar light guide 565. In Detail H, light 1046(H), exiting from nib 1081, undergoes a significant amount of refraction as it enters planar light guide 565. As a result, most, or all of such light enters planar light guide 565 at an angle less than critical angle θ (roughly 42 degrees for a glass or plastic/air interface), and therefore does not undergo TIR but instead exits the planar light guide 565 rather than being guided toward a photosensing element such as a camera (not illustrated) or photo detector (not illustrated). However, when the nib 1081 is in optical contact with the planar light guide, as illustrated in Detail I, light 1046I experiences little or no refraction, and at least a substantial part of light 1046I undergoes TIR within the planar light guide 865, which may guide the light to the photosensing element.

By configuring the nib 1081 as a deformable nib, having elastomeric characteristics, a significant increase may be achieved in the amount of light 1046 that is detected. Furthermore, stylus 1080, together with deformable nib 1081 may be used in the arrangements where contact pressure sensing is desired, as described above in connection with FIGS. 2-4.

At least some of the light, having undergone TIR, may reach the one or more photosensing elements. The photosensing elements may detect such TIR'd light and output to the processor image data representative of the detected TIR'd light. Using appropriate algorithms, the processor may recognize, from the image data, an instance and location of a stylus touch, and may control one or both of the interactive display and the electronic device, responsive to the stylus touch.

In some implementations, the nib 1081 may be configured to provide some minimal level of deformability such that its shape conforms, upon contact with the front surface 567 of the planar light guide 565, to the microscopic and macroscopic surface geometry of the front surface 567.

Figure 11:
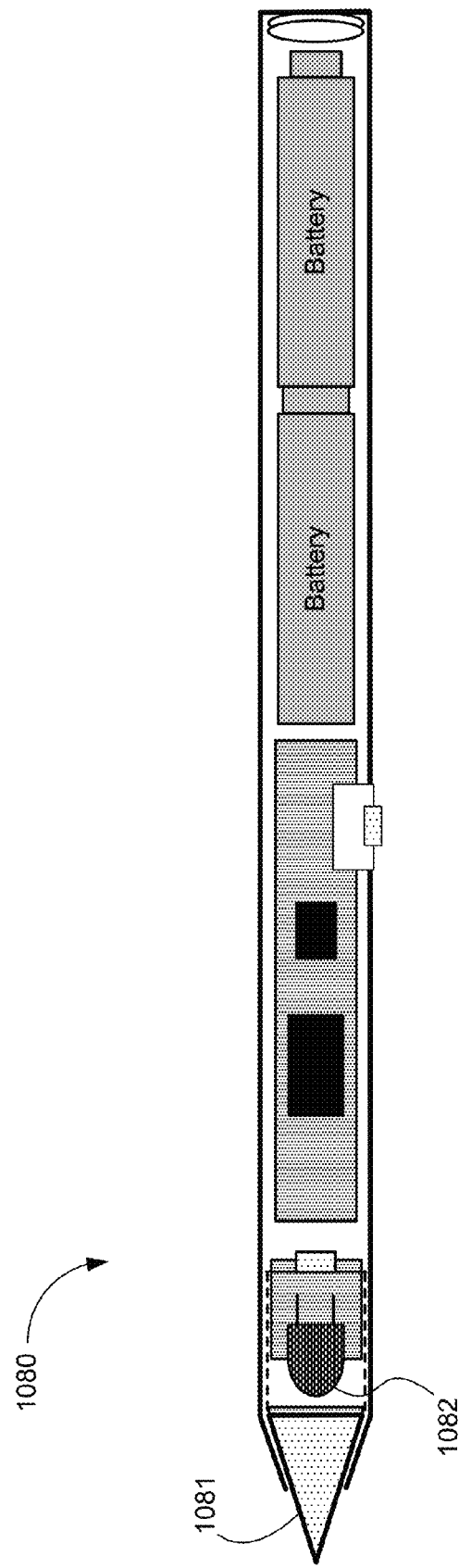
FIG. 11 illustrates an example implementation of an active stylus.

FIG. 11 illustrates an example implementation of an active stylus. In the illustrated implementation, stylus 1080 includes the nib 1081 and the light source 1082. As described above, the nib 1081 is contemplated have some minimal level of deformability so that its shape, upon contact with the front surface 567 of the planar light guide 565, conforms to the microscopic and macroscopic surface geometry the light guide surface. In some implementations, the light source 1082 may be an IR LED. In such an implementation, it is contemplated that the nib 1081 may be formed from material that is substantially transparent to infrared light. In some implementations the material may be silicone, for example.

In some implementations, the nib 1081 includes, near or at an exterior surface, an elastomer layer. The elastomer layer may be a thin layer of material, as thin as 5-10 micrometers, and as much as 1000 microns, that is on the surface of a harder material forming a body of the nib 1081. The body of the nib 1081 may also be composed predominantly from a thicker volume of elastomer material.

Figure 12:
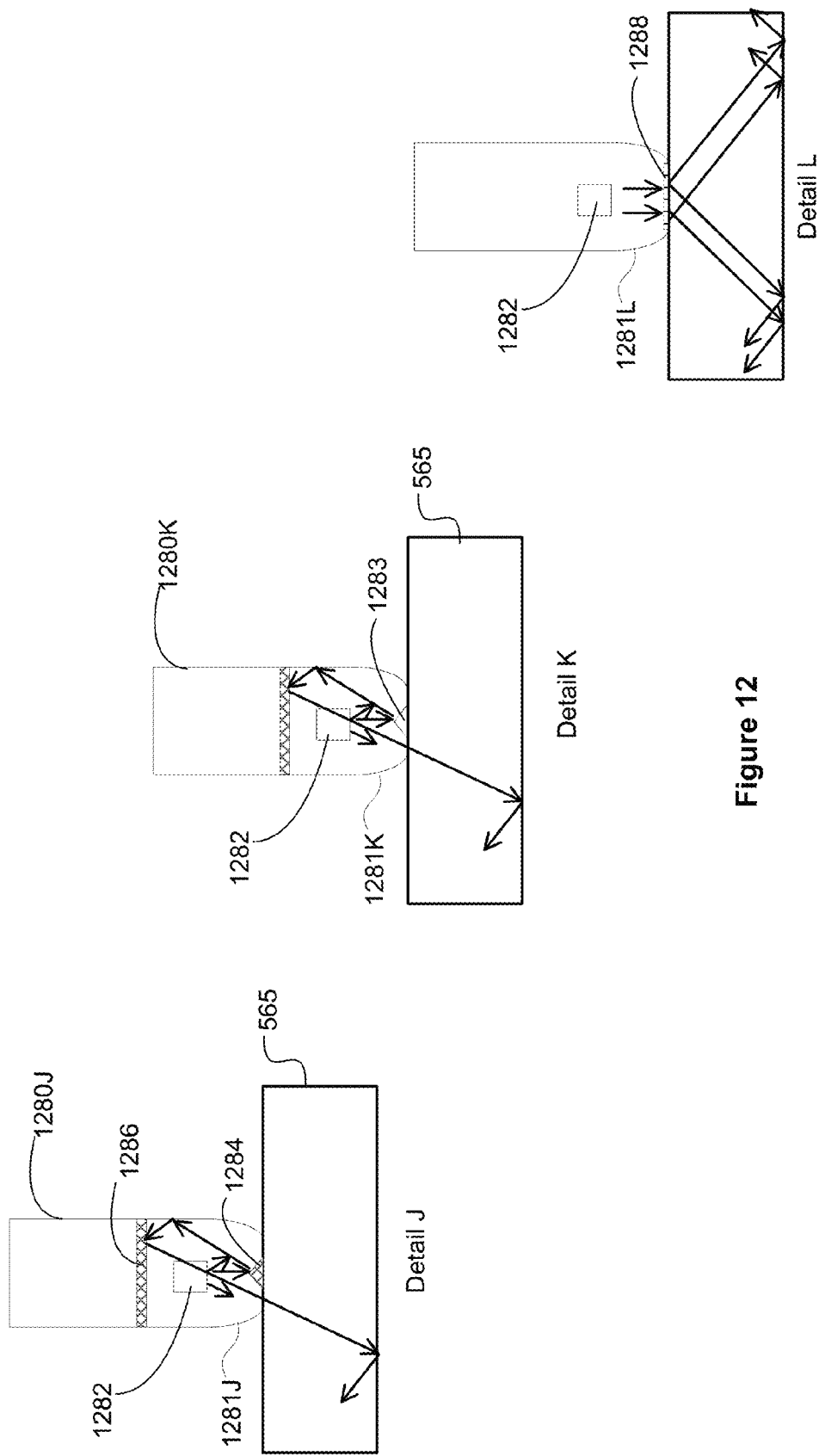
FIG. 12 illustrates further example implementations of an active stylus.

FIG. 12 illustrates further example implementations of an active stylus. In the illustrated implementations, arrangements are contemplated that increase the efficiency of light being trapped into the light guide or cover glass of a display and reduce the amount of light passing into the light guide at angles less than the critical angle. As detailed below, the arrangements illustrated in FIG. 12 reduce the amount of such lost light.

Referring now to Detail J of FIG. 12, an implementation is illustrated in which a central region of a nib 1281J is configured as a first reflector 1284. Light emitted from light source 1282 at angles less than the critical angle strikes the first reflector 1284 and is reflected back into the stylus 1280. In the illustrated implementation the first reflector has a pyramid shape, however first reflector 1284 may have other shapes, and may, alternatively, be flat. A second reflector 1286 may be configured to turn light reflected from first reflector 1284 back towards the light guide 565 for a second opportunity to exit the nib 1281J and be trapped into the light guide 565.

Referring now to Detail K of FIG. 12, an implementation is illustrated in which a central region of a nib 1281J is configured with a pyramid shaped void 1283 (or "air gap") in the center of the nib 1281K. Light emitted from light source 1282 at angles less than the critical angle is totally internally reflected back into the stylus 1280K by virtue of the air gap 1283. Thus, the light is recycled and has a second opportunity to exit the nib 1281K and be trapped into the light guide 565.

Referring now to Detail L of FIG. 12, an implementation is illustrated in which a diffractive microstructure 1288 is embossed into the bottom portion of a nib 1281L. Light emitted from light source 1282 that strikes the diffractive microstructure 1288 is diffracted into specific directions; in this case those directions that are at angles greater than the critical angle. In some implementations, the light emitted by light source 1282 may be collimated and/or monochromatic. In an alternative implementation (not illustrated) the diffractive microstructure 1288 may be replaced by a holographic film.

Figure 13:
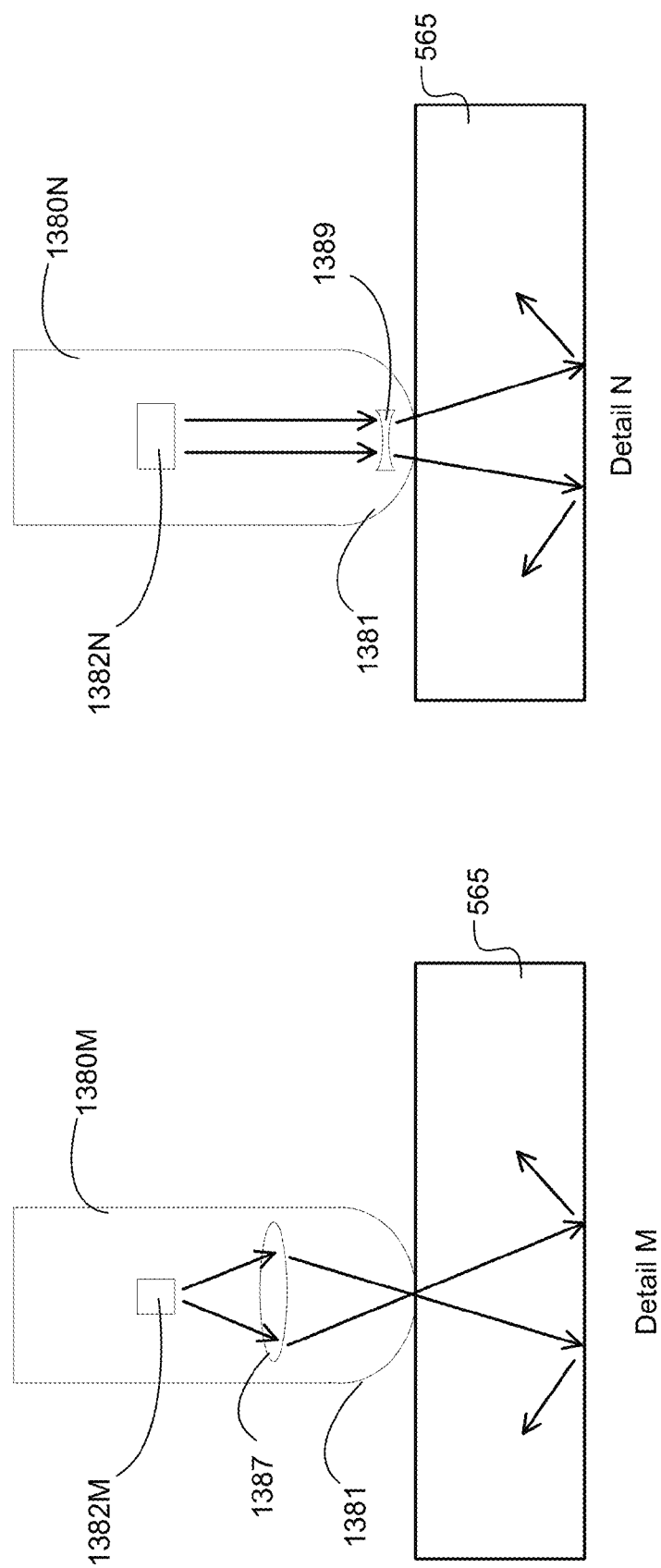
FIG. 13 illustrates yet further example implementations of an active stylus.

FIG. 13 illustrates yet further example implementations of an active stylus. In the illustrated implementations, light emitted by a light source inside the stylus is focused by a lens. As a result, the stylus point of contact with the light guide or cover glass may be smaller, thereby allowing for better spatial resolution. Moreover, by increasing the divergence of light (small f # for the optical system), more light may be available at angles exceeding the critical angle, that may as a result be TIR'd within the light guide 565.

Referring to Detail M of FIG. 13, a stylus 1380M includes lens 1387. The lens 1387 may be configured to focus light emitted from light source 1382M toward a point of a nib 1381 in contact with light guide 565. In an alternative implementation, referring to Detail N of FIG. 13, a stylus 1380N includes a negative (or "diverging") lens 1387 and a source 1382N of collimated light.

Figure 14:
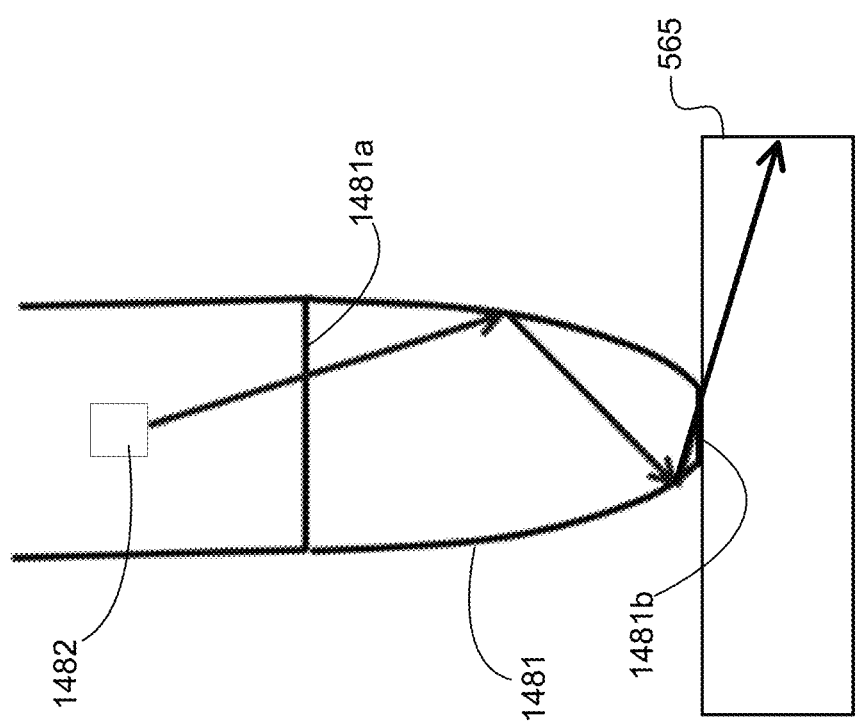
FIG. 14 illustrates an example implementation in which a stylus nib has a parabolic like shape.

FIG. 14 illustrates an example implementation in which a stylus nib has a parabolic like shape. In the illustrated implementation, a nib 1481 may act as a concentrator of light emitted by light source 1482. For the stylus nib geometry shown in FIG. 14, it may be observed that light from light source 1482 is first incident at a light entrance 1481a of the nib 1481. Light entering the nib reflects off the sidewalls until it reaches the narrower end 1481b of the nib 1481. Because narrow nib end 1481b has an area that is smaller than that of light entrance 1481a, the angle of emission becomes larger as a result of the known property of etendue. As a result, there may be an increase in the amount of light being trapped into the light guide 565 in contact with the nib 1481. Moreover, spatial resolution may be enhanced, because a smaller stylus contact point may be contemplated.

As described above in connection with FIG. 10, in some implementations of the presently disclosed techniques, an active stylus includes a deformable nib configured to diffusively pass light emitted from a light source through the nib. As a result of the diffusive feature of the nib, light emitted through the nib may be distributed substantially isotropically.

Figure 15:
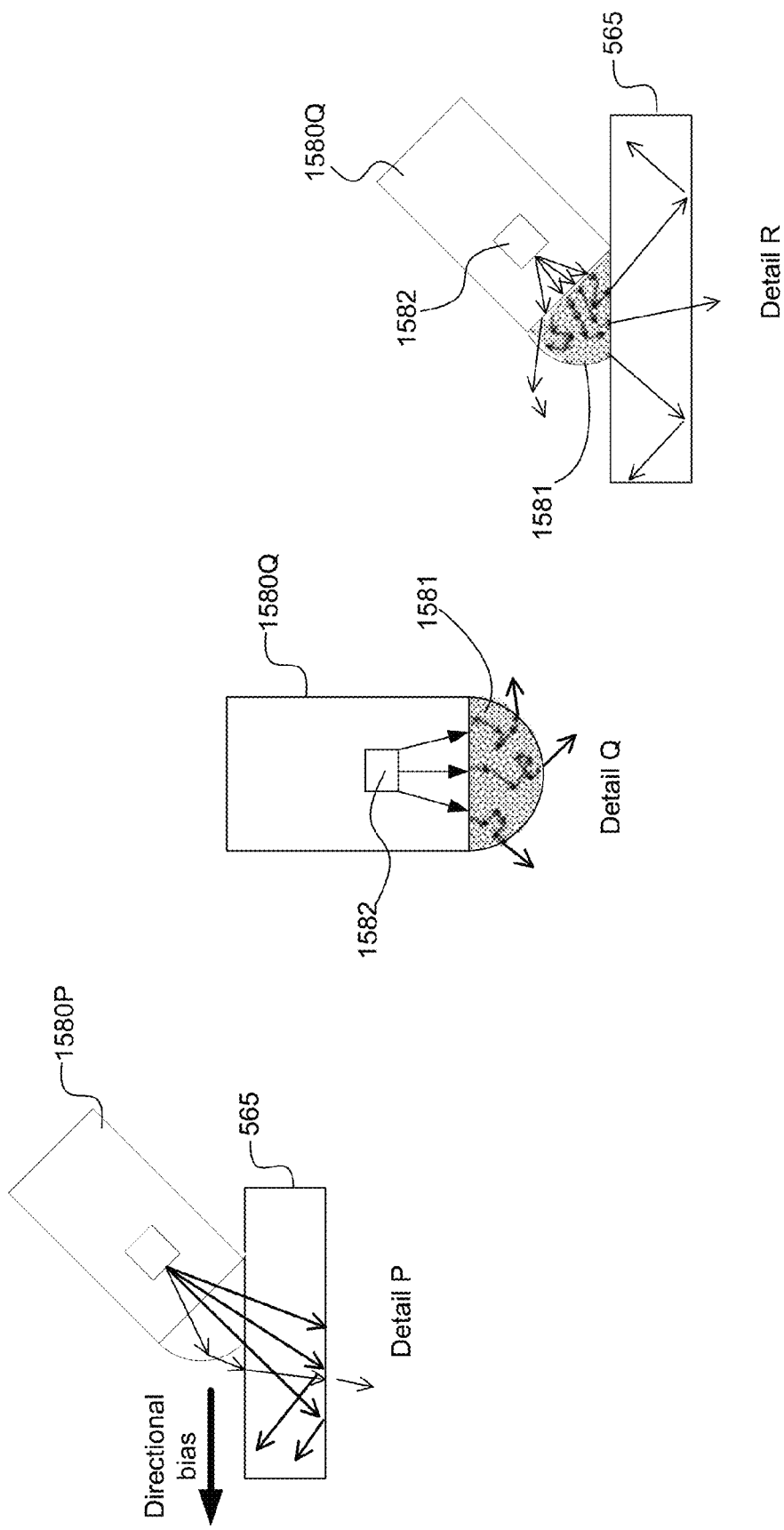
FIG. 15 illustrates example implementations of an active stylus with a deformable nib.

FIG. 15 illustrates example implementations of an active stylus with a deformable nib. Features and benefits of such implementations may be better understood by referring first to Detail P of FIG. 15, which illustrates that, in the absence of a diffusive nib, when an active stylus 1580P is tilted, the emission of light into the light guide 565 will be biased in a direction corresponding to the tilt.

Referring now to Detail Q of FIG. 15, it may be observed that an active stylus 1580Q includes diffusive nib 1581 that may be configured to scatter light isotropically irrespective of stylus tilt. In some implementations, light incident and penetrating the nib from a light source 1582 may be scattered isotropically by nib 1581 with minimal absorption. A transparent plastic material embedded with clear or reflective particles can accomplish this type of scattering. As a result, even when the stylus is tilted (Detail R), light exits nib 1581 in at least a nearly isotropic manner. As a result, light may be trapped equally in all "in plane" directions in the light guide 565 and the photosensing elements detect light as if the stylus was held orthogonally to the screen.

As indicated above, the processor 1004 may execute one or more algorithms in order to recognize, from the image data, an instance and location of a user touch. In addition, the processor 1004 may execute one or more algorithms in order to recognize, from the image data, one or more of a location, a contact pressure and an angular orientation of the user touch or of an active or passive stylus.

For example, in some implementations, the processor 1004 may execute an algorithm that includes determining the location (the "touch location") of a user touch or of an active or passive stylus by analyzing image data received from at least one photosensing element. In some implementations, referring again to FIG. 6, the Y-Z coordinates of respective images $i_{550}$, $i_{v1}$, and $i_{v2}$, within the field of view 610, may be used to determine the touch location. The touch location may initially be measured in terms of azimuth angle with respect to the photosensing element and a separation distance ("range") from the photosensitive element.

More particularly, the Y-axis location of the respective images may be quantitatively related to an azimuth angle of the touch location. For example, where the photosensing element outputs an array of pixel image data, the pixel corresponding to the center of the touch location may be determined, by identifying, for example, which pixel is outputting a peak light intensity. The identified pixel may be mapped to the azimuth angle of the touch location taking into account optical characteristics of the photosensing element such as a lens system, for example.

Referring still to FIG. 6, the algorithm may map the Z-axis separation between kaleidoscope images $i_{550}$, $i_{v1}$, and $i_{v2}$ to a range of the touch location, taking into account optical characteristics of the photosensing element.

If desired, the algorithm may also perform a coordinate transform from the above-obtained (azimuth, range) coordinates to (X, Y) coordinates.

As a further example, in some implementations, the processor 1004 may execute an algorithm that includes determining the touch location using outputs of two or more photosensing elements. FIG. 16 illustrates how azimuthal coordinates of the touch location with respect to each of two photosensitive elements, may be used to obtain X-Y coordinates of the touch location, in some implementations. Irrespective of whether the photo sensing elements are 2-D cameras (as illustrated) or output a 1-D plot (equivalent to a line scan camera), the pixel corresponding to the touch location azimuth coordinate with respect to each photosensing element may be determined, by identifying, for example, which pixel is outputting a peak light intensity. The identified pixel may be mapped to the azimuth angle of the touch location taking into account optical characteristics of the respective photosensing element such as a lens system, for example. Using known triangulation techniques, the X-Y coordinates of touch location may be computationally determined from the respective azimuthal coordinates of as few as two photosensing elements.

Where azimuthal coordinate data from more than two photosensitive elements is available a fitting technique may be applied to obtain a more accurate touch location determination.

Figure 17:
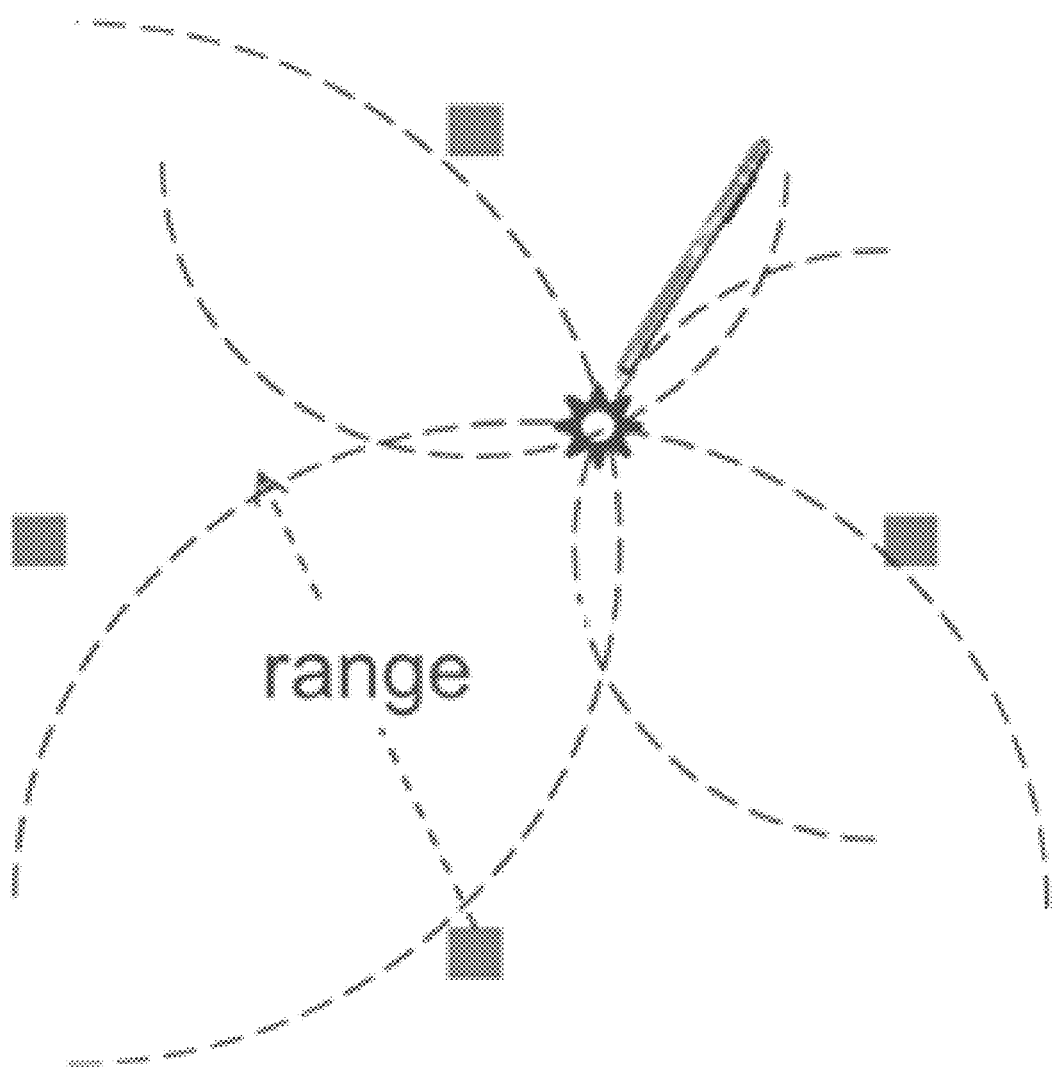
FIG. 17 illustrates how range coordinates of the touch location with respect to each of four photosensitive elements, may be used to obtain X-Y coordinates of the touch location, in some implementations.

As a yet further example, in some implementations, the processor 1004 may execute an algorithm that includes determining the touch location using range information outputs by three or more photosensing elements. FIG. 17 illustrates how range coordinates of the touch location with respect to each of four photosensitive elements, may be used to obtain X-Y coordinates of the touch location, in some implementations. Range information may be determined by analysis of signal level or of Z-axis separation between kaleidoscope images as described above.

Figure 18:
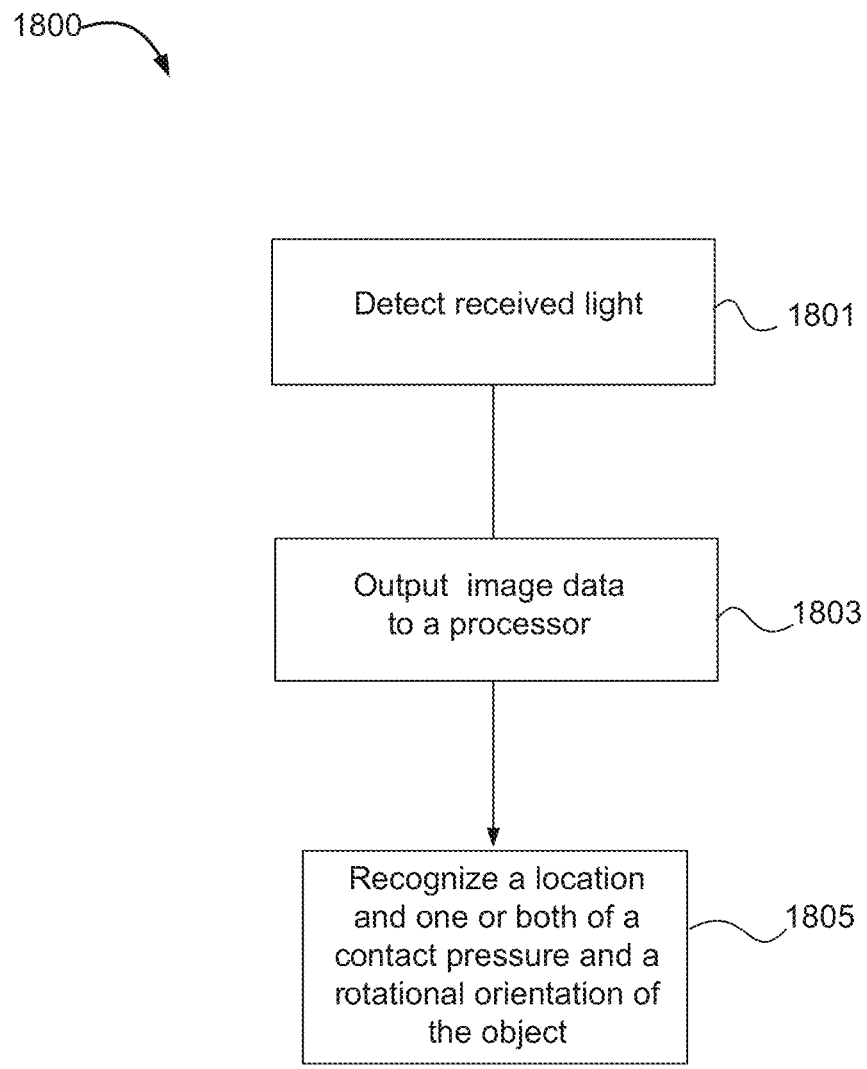
FIG. 18 illustrates a process flow diagram for recognizing, from image data, one or both of a contact pressure and a rotational orientation of an object in contact with an interactive display.

FIG. 18 illustrates a process flow diagram for recognizing, from image data, one or both of a contact pressure and a rotational orientation of an object in contact with an interactive display, according to some implementations. The interactive display may be configured to execute the process 1800. In some implementations, the interactive display 100, including photosensing element 133 may be configured to execute the process 1800 in cooperation with processor 1004. The process 1800 may begin at block 1801 with detecting with a photosensing element, received light. In some implementations, the received light may result from interaction between light emitted by the light source and an object in at least partial optical contact with a front surface of a display cover glass of the interactive display 100. Alternatively, or in addition the received light may be emitted by the object, where, for example the object is an active stylus.

At block 1803, the photosensing element may output image data to the processor. At block 1805, the processor may recognize, from the image data, one or both of a contact pressure and a rotational orientation of the object.

Thus, improved techniques for enabling an interactive display to detect and respond to particular characteristics of touch interactions with the interactive display have been disclosed. In some or all of the above-described implementations, one or more of the following techniques may be implemented: A film or surface treatment may be applied to the top surface of the light guide to optical coupling. Alternatively or in addition, modulation may be applied to the intensity of the illumination light to improve sensitivity of the system. In some implementations, coherent light, such as produced by a laser, may be used for the illumination light. A resulting speckle pattern may be used to improve the sensitivity of the system. In some implementations, camera images may be enhanced using a sharpening algorithm, geometric transform or distortion correction, spatial frequency filtering (removing background light and noise, as the multiple reflections are in a specific spatial frequency range), deconvolution algorithm (to separate overlapping multiple reflections), or super resolution algorithm (using multiple reflections to construct a higher resolution image). These algorithms may be used to make the initial touch threshold "softer" for the user.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that can be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus comprising:
   an interactive display, having a front surface that includes a viewing area;
   a planar light guide disposed proximate to and behind the front surface;
   a light source that emits one or both of visible and infrared light; and
   at least one photo sensing element coupled with the first planar light guide and disposed outside of or proximate to a periphery of the viewing area; wherein:
      the planar light guide is configured to receive light, the received light resulting from one or both of scattering of light emitted by the light source by an object in optical contact with the front surface, and light emitted by the object;
      the photo sensing element is configured to detect at least a portion of the received light, to register, substantially simultaneously, within a field of view of the photo sensing element, multiple discrete reflections of an image of the object, and to output, to a processor, image data of the multiple discrete reflections, the multiple discrete reflections resulting from the portion of the received light having undergone total internal reflection within the planar light guide before being detected by the photo sensing element; and
      the processor is configured to recognize, from the image data of the multiple discrete reflections, a location, a contact pressure and a rotational orientation of the object.

2. The apparatus of claim 1, wherein the light source emits light in a direction substantially orthogonal to the front surface.

3. The apparatus of claim 2, wherein the light source is configured as or includes a backlight of a liquid-crystal or field sequential color display, the front-light of a reflective display or light from an emissive display.

4. The apparatus of claim 1, wherein the object is a passive stylus or an appendage or a digit of a user.

5. The apparatus of claim 1, wherein:
   the object is a passive stylus;
   the received light results from scattering of light emitted by the light source by a nib of the passive stylus; and
   the nib has an elastomeric characteristic of deforming under pressure and a diffusely reflective surface.

6. The apparatus of claim 1, wherein:
   the object is an active stylus, including a nib;
   the received light results from light emitted by the active stylus through the nib; and
   the nib has an elastomeric characteristic of deforming under pressure.

7. The apparatus of claim 6, wherein the nib is configured to scatter the light emitted by the active stylus through the nib in substantially isotropic manner.

8. The apparatus of claim 1, wherein the object has an elastomeric characteristic of deforming under pressure, and image data of the detected light includes characteristic information related to a contact pressure applied between the object and the front surface.

9. The apparatus of claim 8, wherein the processor is configured to recognize and distinguish between individual contact pressures for multiple touch points from the characteristic information.

10. The apparatus of claim 1, wherein the photo sensing element includes a photosensitive detector array or camera.

11. The apparatus of claim 10, wherein the photo sensing element is disposed within the plane or behind the plane of the planar light guide.

12. The apparatus of claim 1, wherein the processor is configured to recognize and distinguish between simultaneous or nearly simultaneous touches by both a stylus touch and a finger.

13. The apparatus of claim 1, wherein the photosensing element is a camera, including a lens having an optical axis, the camera being disposed with the optical axis approximately parallel to the front surface.

14. An apparatus comprising:
   an electronic display, having a front surface that includes a viewing area;
   a planar light guide disposed proximate to and behind the front surface;
   a light source that emits one or both of visible and infrared light; and
   at least one photo sensing element coupled with the first planar light guide and disposed outside of or proximate to a periphery of the viewing area; wherein:
      the planar light guide is configured to receive scattered light, the received scattered light resulting from interaction between light emitted by the light source and an object in optical contact with the front surface;
      the photo sensing element is configured to detect at least a portion of the received scattered light, to register, substantially simultaneously, within a field of view of the photo sensing element, multiple discrete reflections of an image of the object, and to output, to a processor, image data of the multiple discrete reflections, the multiple discrete reflections resulting from the portion of the received light having undergone total internal reflection within the planar light guide before being detected by the photo sensing element;
      the processor is configured to recognize, from the image data of the multiple discrete reflections, a location, a contact pressure and a rotational orientation of the object; and
      the light source emits light in a direction substantially orthogonal to the front surface.

15. The apparatus of claim 14, wherein the light source is configured as or includes a backlight of a liquid-crystal or field sequential color display, the front-light of a reflective display or light from an emissive display.

16. The apparatus of claim 14, wherein the object has an elastomeric characteristic of deforming under pressure, and image data of the detected light includes characteristic information related to a contact pressure applied between the object and the front surface.

17. The apparatus of claim 14, wherein:
the object is a passive stylus;
the received scattered light results from interaction between light emitted by the light source and a nib of the passive stylus; and
the nib has an elastomeric characteristic and a diffusely reflective surface.

18. An apparatus comprising:
an interactive display, having a front surface that includes a viewing area;
a light source that emits one or both of visible and infrared light;
at least one photosensing element disposed outside of or proximate to a periphery of the viewing area; and
means, disposed proximate to and behind the front surface, coupled with the at least one photosensing element, for receiving light, the received light resulting from one or both of: interaction between light emitted by the light source and an object in optical contact with the front surface, and light emitted by the object; and
wherein:
the photosensing element is configured to detect at least a portion of the received light, to register, substantially simultaneously, within a field of view of the photo sensing element, multiple discrete reflections of an image of the object, and to output, to a processor, image data of the multiple discrete reflections, the multiple discrete reflections resulting from the portion of the received light having undergone total internal reflection within the planar light guide before being detected by the photo sensing element; and
the processor is configured to recognize, from the image data of the multiple discrete reflections, a location, and a contact pressure and a rotational orientation of the object.

19. The apparatus of claim 18, wherein the light source emits light in a direction substantially orthogonal to the front surface.

20. The apparatus of claim 19, wherein the light source is configured as or includes a backlight of a liquid-crystal or field sequential color display, the front-light of a reflective display or light from an emissive display.

21. A method comprising:
detecting, with a photosensing element, a portion of received light, the received light resulting from one or both of: interaction between light emitted by the light source and an object in at least partial optical contact with a front surface of a display cover glass of an interactive display, and light emitted by the object;
registering, with the photosensing element, substantially simultaneously, within a field of view of the photo sensing element, multiple discrete reflections of an image of the object, the multiple discrete reflections resulting from the portion of the received light having undergone total internal reflection within a planar light guide before being detected by the photo sensing element;
outputting image data of the multiple discrete reflections from the photosensing element to a processor; and
recognizing, with a processor, from the image data of the multiple discrete reflections, a location, a contact pressure and a rotational orientation of the object.

22. The method of claim 21, wherein the light source emits light in a direction substantially orthogonal to the front surface.

23. The method of claim 21, wherein the light source is configured as or includes a backlight of a liquid-crystal or field sequential color display, the front-light of a reflective display or light from an emissive display.

24. The method of claim 21, wherein the processor is configured to make a determination, from the image data, of a location of the object.

25. The method of claim 24, wherein the processor is configured to make the determination by one or more of:
measuring azimuth angle and range of the object with respect to the photosensing element;
measuring azimuth angles of the object with respect to a plurality of photosensing elements; and
measuring ranges of the object with respect to a plurality of photosensing element.

* * * * *